US012636528B2

(12) United States Patent
Axelsson

(10) Patent No.: US 12,636,528 B2
(45) Date of Patent: May 26, 2026

(54) HARNESS SHOCK ABSORBER ASSEMBLY, HARNESS SHOCK ABSORBER, FALL PROTECTION SAFETY OR SCBA HARNESS AND METHOD OF RETROFITTING A HARNESS SHOCK ABSORBER

(71) Applicant: 3M INNOVATIVE PROPERTIES COMPANY, St. Paul, MN (US)

(72) Inventor: Peter L. Axelsson, Borlänge (SE)

(73) Assignee: 3M Innovative Properties Company, St. Paul, MN (US)

( * ) Notice: Subject to any disclaimer, the term of this patent is extended or adjusted under 35 U.S.C. 154(b) by 427 days.

(21) Appl. No.: 18/326,796

(22) Filed: May 31, 2023

(65) Prior Publication Data

US 2023/0390595 A1 Dec. 7, 2023

(30) Foreign Application Priority Data

Jun. 1, 2022 (EP) .................................... 22176782

(51) Int. Cl.
*A62B 35/00* (2006.01)

(52) U.S. Cl.
CPC ................................ *A62B 35/0025* (2013.01)

(58) Field of Classification Search
CPC ............................ A62B 35/0025; A62B 35/04
(Continued)

(56) References Cited

U.S. PATENT DOCUMENTS 3,862,673 A * 1/1975 Benson ................. F16F 1/3713
280/805
4,192,493 A * 3/1980 Koughan .............. F16F 9/0418
267/74
6,095,282 A * 8/2000 Sadeck .................... A62B 1/04
182/191
(Continued)

FOREIGN PATENT DOCUMENTS

WO 2012021563 A2 2/2012
WO 2012021563 A3 2/2012
WO 2023119151 A1 6/2023

OTHER PUBLICATIONS

Extended European Search Report received for EP Application No. 22176782.5, mailed on Nov. 4, 2022, 2 pages.

*Primary Examiner* — Muhammad Ijaz

(57) ABSTRACT

A harness shock absorber assembly for a personal protective equipment and a harness shock absorber for such a shock absorber assembly. The shock absorber assembly comprises a deformable element exhibiting a mechanical resistance against deformation and a flexible strap comprising a middle portion and two protruding portions facing away from each other. The middle portion is tightly wrapped around the deformable element such that pulling the protruding portions away from each other deforms the deformable element. A fall protection safety harness comprising a harness shock absorber assembly according to the present disclosure. A method of retrofitting a harness shock absorber according to the present disclosure to a fall protection safety harness or to a SCBA harness. The method comprises the steps of: providing a fall protection safety harness or a SCBA harness comprising a strap, providing a shock absorber according to the present disclosure comprising a deformable element; and wrapping at least one of the flexible straps of the harness tightly around the deformable element of the harness shock absorber to form the harness shock absorber assembly. The deformation of the deformable element of the harness shock absorber assembly absorbs energy impacting on the personal protective equipment and thereby protects the user's body from impacts or injuries. The shock absorber assembly can easily and reliably be retrofitted to a fall protection safety harness or to a SCBA harness and thereby increase the safety for the user.

15 Claims, 11 Drawing Sheets

(58) Field of Classification Search
USPC ........................................................ 182/3, 6
See application file for complete search history.

(56) References Cited

U.S. PATENT DOCUMENTS

| | | | | |
|---|---|---|---|---|
| 6,378,465 | B1 * | 4/2002 | Austin | A62B 35/04 182/4 |
| 8,678,134 | B2 * | 3/2014 | Wood | A62B 1/14 182/5 |
| 2005/0067221 | A1 * | 3/2005 | Wolner | A62B 35/0031 182/3 |
| 2010/0293696 | A1 * | 11/2010 | Real | A41D 13/0007 2/93 |
| 2010/0293759 | A1 * | 11/2010 | Wada | A62B 35/0031 267/136 |
| 2011/0094839 | A1 * | 4/2011 | Blomberg | A62B 35/04 219/121.72 |
| 2012/0222912 | A1 * | 9/2012 | Wood | A62B 35/0031 182/6 |
| 2013/0277519 | A1 * | 10/2013 | Poldmaa | A62B 1/04 248/237 |
| 2014/0060966 | A1 * | 3/2014 | Patel | A62B 35/0037 24/265 AL |
| 2019/0022430 | A1 * | 1/2019 | Denike | B66D 1/12 |
| 2019/0388717 | A1 * | 12/2019 | Ibarra | A62B 35/0031 |
| 2020/0114181 | A1 * | 4/2020 | Monahan | A62B 35/0018 |
| 2021/0178202 | A1 * | 6/2021 | Carroccia | A62B 35/0018 |
| 2022/0355134 | A1 * | 11/2022 | McLeod | A62B 35/0018 |
| 2023/0026773 | A1 * | 1/2023 | Wang | A62B 35/0018 |
| 2023/0320463 | A1 * | 10/2023 | Weiss | A44B 11/2519 182/3 |
| 2023/0390595 | A1 * | 12/2023 | Axelsson | A62B 35/04 |
| 2024/0278048 | A1 * | 8/2024 | Šimocko | A62B 35/0025 |
| 2024/0278049 | A1 * | 8/2024 | Safe | A62B 35/0018 |
| 2024/0299784 | A1 * | 9/2024 | Carroccia | A62B 35/04 |
| 2025/0057277 | A1 * | 2/2025 | Axelsson | A42B 3/14 |

* cited by examiner

HARNESS SHOCK ABSORBER ASSEMBLY, HARNESS SHOCK ABSORBER, FALL PROTECTION SAFETY OR SCBA HARNESS AND METHOD OF RETROFITTING A HARNESS SHOCK ABSORBER

The present disclosure relates to a harness shock absorber assembly and to a harness shock absorber for such a harness shock absorber assembly. The present disclosure further relates to a fall protection safety harness comprising such a harness shock absorber assembly and to a SCBA harness comprising such a harness shock absorber assembly. The present disclosure moreover relates to a method of retrofitting a harness shock absorber to a fall protection safety harness or to a SCBA harness.

Fall protection safety harnesses are often used to reduce the likelihood of a user experiencing a fall, and/or to safely arrest the user in the event of a fall. Such harnesses are often used in combination with one or more of a lanyard, a vertical safety system or ladder climb assist system, a self-retracting lifeline or rope, a crane or davit for carrying persons at a certain height, and other fall-protection equipment. Carrying persons at a certain height includes a system which prevents persons from negative impact in the event of falling.

Self-contained breathing apparatus (SCBA) harnesses are usually used by a wearer for carrying an SCBA apparatus during use. Typically, the SCBA harness comprises shoulder straps and a waist strap such that the SCBA can be worn on the back of the wearer.

In certain instances, a shock may be introduced into such a harness, for example when a user is experiencing a fall when wearing a fall protection safety harness or when a user is wearing a SCBA harness. Such a shock may cause injuries or at least some discomfort to the wearer or user of such harnesses.

It is therefore an object of the present disclosure to reduce the impact of a shock introduced into such a harness. It is also an object of the present disclosure to provide an improved harness with respect to wearing comfort and safety aspects.

In a first aspect, the present disclosure relates to a harness shock absorber assembly comprising a deformable element exhibiting a mechanical resistance against deformation. The harness shock absorber assembly further comprises a flexible strap comprising a middle portion and two protruding portions facing away from each other. The middle portion is tightly wrapped around the deformable element such that pulling the protruding portions away from each other deforms the deformable element. The advantage of such a harness shock absorber assembly is that it is an easy and reliable way to reduce the impact of a shock introduced into a strap, e. g. of a fall portion safety harness or a SCBA harness. Injuries, e. g. broken legs or the like, are reduced or avoided. Also, breaking of the straps is reduced or avoided by such a harness shock absorber assembly.

In a second aspect, the present disclosure relates to a harness shock absorber for a harness shock absorber assembly. The harness shock absorber comprises a deformable element. The deformable element exhibits a mechanical resistance against deformation. The deformable element is configured and arranged to support a middle portion of a strap of a harness of the harness shock absorber assembly such that—when the strap is tightly wrapped around the deformable element—pulling the protruding portions of the strap away from each other deforms the deformable element. The advantage of such a harness shock absorber is that it is an easy and reliable way equip a harness, e. g. of a fall portion safety harness or a SCBA harness, to reduce the impact of a shock introduced into a strap of such harness. Injuries, e. g. broken legs or the like, are reduced or avoided. Also, breaking of the straps is reduced or avoided by such a harness shock absorber in a harness shock absorber assembly.

In a third aspect, the present disclosure relates to a fall protection safety harness comprising

- a harness shock absorber assembly according to the present disclosure. The fall protection safety harness comprises at least one shoulder strap and at least one waist strap. The at least one shoulder strap and/or the at least one waist strap forms the strap of the harness shock absorber assembly. The advantage of such a fall protection safety harness with such a harness shock absorber assembly is that it is an easy and reliable way to reduce the impact of a shock introduced into a strap, e. g. of a fall portion safety harness. Injuries, e. g. broken legs or the like, are reduced or avoided. Also, breaking of the straps is reduced or avoided by such a harness shock absorber assembly.

In a fourth aspect, the present disclosure relates to a SCBA harness comprising a harness shock absorber assembly according to the present disclosure. The SCBA harness comprises at least one shoulder strap and at least one waist strap. The at least one shoulder strap and/or the at least one waist strap forms the strap of the harness shock absorber assembly. It is understood that the harness shock absorber for the harness shock absorber assembly is formed by the deformable element as described herein and above. The advantage of such a fall protection safety harness with such a harness shock absorber for a harness shock absorber assembly is that it is an easy and reliable way to reduce the impact of a shock introduced into a strap, e. g. of a SCBA harness. Injuries, e. g. broken legs or the like, are reduced or avoided. Also, breaking of the straps is reduced or avoided by such a harness shock absorber assembly.

In a fifth aspect, the present disclosure relates to method of retrofitting a harness shock absorber according to the present disclosure to a fall protection safety harness or to a SCBA harness to form a harness shock absorber assembly according to the present disclosure. The method comprises the steps of: providing a fall protection safety harness or a SCBA harness comprising a flexible strap, providing a harness shock absorber according to the present disclosure comprising a deformable element and wrapping at least one of the straps of the harness tightly around the deformable element of the harness shock absorber to form the harness shock absorber assembly. Such a method is an easy and reliable way to provide a harness initially not having shock-absorbing capabilities with a shock absorber assembly according to the present disclosure which would enjoy the same advantages as described above for the fall protection safety harness or the SCBA harness providing an increased level of safety for such personal protective equipment.

Personal protective equipment (PPE) within the meaning of the present disclosure is understood as articles for protective users or workers in a certain environment which may have some negative impact to the user or worker. PPE typically includes wearables like

- hearing protection, jackets of different kinds or the like. For the present disclosure, PPE mainly includes harness, e. g. fall protection safety harnesses, SCBA harnesses or the like. Such harness typically comprises one or more straps forming the harness. Such harness is configured so that when the harness is worn by a user, a first ventral strap of the harness extends from the right shoulder of the user to the right hip of the user and a second ventral strap of the harness extends from the left shoulder of the user to the left hip of the user. Alternatively, the harness may comprise a first and a second buckle portion, wherein the first buckle portion of the fall protection safety harness is mounted on the first ventral strap and wherein the second buckle portion is mounted on the second ventral strap, the first and second buckle portions being detachably attached to each other to form a ventral buckle, wherein the first and second ventral straps and the first and second buckle portions are configured so that the ventral buckle is at least generally aligned with a sagittal plane of the user and harness. As a further alternative, such a harness is configured so that when the harness is worn by a user, a first ventral strap of the harness extends from the right shoulder of the user to the left hip of the user and a second ventral strap of the harness extends from the left shoulder of the user to the right hip of the user.

Deformation within the meaning of the present disclosure is understood as an action or a process of deforming or distortion resulting in a change in size and/or shape of an object. According to this disclosure, an object is in a non-deformed condition prior to the deformation, i. e. not showing a change in size and/or shape, whereas a deformed condition refers to an object being deformed, i. e. having a changed size and/or shape. Such change may apply to the object as a whole or just to parts of the object. Kinetic energy introduced to the deformable element by the straps of a personal protective equipment, e. g. a fall protection harness carrying persons at a certain height to which the deformable element is attached, may introduce forces—through the straps thereof—to the deformable element causing its deformation. Upon deformation, kinetic energy is being absorbed by the change of the object's size and/or shape such that the applying energy is reduced or eliminated and does not provide negative impacts to the user's or worker's body anymore. Deformation typically includes elastic or plastic deformation. Elastic deformation is substantially reversible and the deformed element substantially returns after the deformation to its original size and/or shape prior to deformation. Such a deformation is also referred to as temporary or non-permanent deformation. An elastic deformation may be achieved through the use of a resilient material. In contrast thereto, plastic deformation means that the deformation is irreversible and that the deformed element does not return after the deformation to its original size and/or shape prior to deformation. The plastic deformation is also referred to as permanent deformation. A plastic deformation may be achieved through the use of a non-reversibly deformable material. It is noted that even in case of an elastic deformation, some plastic deformation may occur in parallel or vice versa. It is also conceivable that the deformable element is configured and arranged that the deformation behavior changes from elastic deformation to plastic deformation, e. g. after an initial elastic deformation of the deformable element a plastic deformation may occur.

Mechanical resistance within the meaning of the present disclosure is understood as a behavior that an object or element, here a part of the personal protective equipment, exhibits under influence of mechanical forces, i. e. forces acting upon the object or element e.g. when a deformation occurs. In particular, the object or element has the behavior to withstand the mechanical forces to some extent. An absorption of the impacting energy may happen thereby partially or entirely.

Supported within the meaning of the present disclosure means that the strap is laid onto the surface of the deformable element and is moveable or slidable relative to the surface of the deformable element. Supported does not include a fixed connection between the strap and the deformable element.

Movable or slidable within the meaning of the present disclosure means that a point on the strap is displaced relative to a point on the surface of the deformable element. In particular, the strap moves or slides in a direction substantially parallel to the main extension of the strap.

Wrapped tightly within the meaning of the present disclosure means that the middle portion of the strap is arranged around the deformable element such that no loose or hanging portions or hanging or sagging loops of the straps are created. In other words, the strap is in intimate contact to the surface of the deformable element. It is noted that "tightly wrapped around" includes that the strap is in contact with the outer perimeter of the deformable element. Also included is that the strap is in contact with an inner portion of the deformable element and is wrapped therearound. In the latter case, slits or elongated openings are arranged within the deformable element of the harness shock absorber through which the straps are guided in a similar way as the strap guiding means as described herein as well. In other words, wrapping tightly may only be around a part or portion of the deformable element, i. e. through slits or opening, and not necessarily around the outer perimeter of the deformable element. In this context, the area between the outer perimeter and the slit for receiving the straps is considered a strap guiding means which is explained in more detail below.

Protruding portions within the meaning of the present disclosure is understood as parts, e. g. portions or sections, of the flexible straps of a harness which extend beyond the perimeter of the deformable element, i. e. protrude from the deformable element when the strap is tightly wrapped therearound. It is understood that the strap continues beyond the protruding portions. Shock within the meaning of the present disclosure is understood as an impact introduced in a short period of time. Shock absorption is understood as a delay of that time period leading to an attenuation of the impact.

The deformable element is typically made of a polymeric material using an injection molding process. Alternatively, the deformable element may be made by cutting or punching of a sheet material to provide the shape and structure thereof, although machining or milling is also conceivable. The deformable element may also be made of metal, wherein molding, machining, milling or drilling would be suitable methods to manufacture the deformable element.

In one embodiment, the deformable element of the harness shock absorber assembly exhibits an elongated shape having a length l, a width w perpendicular to the length l, a thickness t perpendicular to the length l and the width w and support distances d1, d2, d3 arranged on the deformable element for supporting the strap. The deformable element of the shock absorber assembly can be brought from a non-deformed condition with the length l, the thickness t, the width w and the support distances d1, d2, d3 to a deformed condition with the length l', the thickness t', the width w' and the support distances d1', d2', d3', such that the length l' is smaller than length l, the width w' is smaller than the width w, the distance d1 'is smaller than the distance d1, the distance d2' is smaller than the distance d2 and/or the distance d3' is smaller than the distance d3. Such an arrangement is beneficial as the change of the dimensions length, width or the support distances may provide for a sufficient and controlled deformation and thus for a sufficient and controlled extension of the protruding portions of the strap. Other advantages are listed above for the harness shock absorber assembly. The length of such a deformable element is greater than the width, for example the length may be 2-times, 3-times or 4-times of the width. Such an elongated shape is beneficial as it provides for an efficient use of the space available in a personal protective equipment, for example a fall protection safety harness or a SCBA harness. Also, due to the elongated shape, sufficient space is provided on the deformable element such that the strap can reliably be wrapped around in a tight manner and with more than one winding.

In a further embodiment, the deformable element of the harness shock absorber assembly comprises a main body and an opening formed therein, wherein the main body and/or the opening are deformed upon deformation of the deformable element. The arrangement of an opening formed within the main body of the deformable element provides for a reliable and sufficient deformation of the deformable element when pulling the protruding portions away from each other. The main body of the deformable element and/or the opening therein may undergo a reduction of size and/or an alteration of shape which facilitates a sufficient deformation of the deformable element.

In one embodiment, the length l of the deformable element of the harness shock absorber assembly decreases upon deformation of the deformable element. Such a deformable element is beneficial as it provides for a reliable and sufficient deformation of the deformable element when pulling the protruding portions away from each other. In a further embodiment, the width w of the deformable element of the harness shock absorber assembly decreases upon deformation of the deformable element. Such a deformable element is beneficial as it provides for a reliable and sufficient deformation of the deformable element when pulling the protruding portions away from each other. In a further embodiment, the thickness t of the deformable element of the harness shock absorber assembly decreases upon deformation of the deformable element. Such a deformable element is beneficial as it provides for a reliable and sufficient deformation of the deformable element when pulling the protruding portions away from each other.

In yet a further embodiment, at least one of the support distances d1, d2, d3 of the deformable element of the harness shock absorber assembly decreases upon deformation of the deformable element. Such a deformable element is beneficial as it provides for a reliable and sufficient deformation of the deformable element when pulling the protruding portions away from each other.

It is conceivable that the deformable element is configured and arranged such that one, several or all the dimensions, for example the length l, the width w and/or the support distances d1, d2, d3 decrease upon deformation. Such a deformable element is beneficial as it provides for a reliable and sufficient deformation of the deformable element when pulling the protruding portions away from each other.

In one embodiment, the middle portion of the strap is supported by the deformable element of the harness shock absorber assembly. Such an arrangement is of advantage as the strap is reliably and securely arranged at the deformable element thereby.

In another embodiment, the two protruding portions of the flexible strap each protrude from different sides of the deformable element of the harness shock absorber assembly. Such an arrangement provides for some design variations within the personal protective equipment, e.g. a fall protection safety harness or a SCBA harness, as the protruding portions provide for a good fit of the personal protective equipment with such a shock absorber assembly onto the user's or worker's body. Also, a sufficient deformation of the deformable element may be achieved through such an arrangement of the protruding portions.

In one embodiment, the deformable element of the harness shock absorber assembly comprises strap guiding means for guiding the strap at the deformable element, wherein the strap guiding means preferably comprises a guiding arm arranged such that a slot for receiving the strap is formed between the guiding arm and the main body of the deformable element. Such a guiding arm and such a slot may be formed such that the slot is open on one end thereof. It is also conceivable that the slot is closed on both ends. The guiding arm may protrude from the perimeter of the deformable element or may protrude from the major surface of the deformable element. A strap guiding means is of advantage as guiding of the strap on the deformable element provides for a reliable and secure assembly. An unwanted movement of the strap, for example in a direction transverse to the main extension of the strap, is prevented thereby while still allowing for movement in the main extension direction of the strap, wherein such movement may be required for the function of the harness shock absorber assembly.

In yet another embodiment, the strap of the harness shock absorber assembly comprises a twisted portion when wrapped around the deformable element such that the strap exhibits a 180 degrees twist at the deformable element, wherein the strap preferably comprises two twisted portions. As a result of the twisted portion, the strap turns from a first major surface of the deformable element to a second major surface of the deformable element. Such an arrangement with a twisted portion provides for a strap which has a sufficient length of the middle portion wrapped around the deformable element. A sufficient increase of the length of the protruding portions of the strap protruding from the deformable element is achieved thereby as more than one layer of the strap on the deformable element can move.

In another embodiment, the strap of the harness shock absorber assembly is made of a woven textile. Such a structure has the advantage that the strap exhibits the required properties with regard to tensile strength, flexibility and manufacturing costs.

In a further embodiment, the strap of the harness shock absorber assembly comprises polypropylene, polyester or polyamide. Such a material has the advantage that the strap exhibits the required properties with regard to tensile strength, flexibility and manufacturing costs. Such materials may also be used for woven textiles.

In still another embodiment, the harness shock absorber assembly comprises two flexible straps each comprising a middle portion and two protruding portions facing away from each other. The middle portion is tightly wrapped around the deformable element such that pulling the protruding portions away from each other deforms the deformable element. The middle portions of the two straps at least partially overlap with each other. The advantage of such an assembly with two straps is that a good fit of the personal protective equipment is provided when worn by a user.

In one embodiment, the deformable element of the harness shock absorber assembly comprises a reversibly deformable material. Such a reversibly deformable material for the deformable element is beneficial as the deformable element may return to its original shape and/or size after release of the load, which may provide for a re-usable harness shock absorber assembly. In a certain embodiment, the resilient material of the deformable element of the harness shock absorber assembly is selected from polycarbonate, polyethylene, preferably high-density polyethylene, acrylonitrile-butadiene-styrene. Such a material is advantageous because it provides for reliable properties of the deformable element regarding the deformation and the return to the original shape.

In one embodiment, the deformable element of the harness shock absorber assembly comprises a non-reversibly deformable material. Such a non-reversibly deformable material facilitates an irreversible deformation of the deformable element. This may be useful to provide an indicator function to the user of the personal protective equipment, i. e. an indication to the user that the deformable element has been deformed. Also, an unwanted re-use of the shock absorber assembly may be prevented thereby as the previous use with the deformation is visible on the deformable element. In a certain embodiment, the non-reversibly deformable material of the deformable element of the harness shock absorber assembly is selected from polystyrene, polyvinyl chloride, acrylic materials. Such a material is advantageous because it provides for reliable properties of the deformable element regarding deformation and further supports the indication function to the user about a load acting on the strap.

In another embodiment, the thickness t of the deformable element of the harness shock absorber assembly is in the range of 0.1 to 15 mm in a non-deformed condition. Such a thickness is of advantage as it provides for a space-saving arrangement of the deformable element within a personal protective equipment, for example a fall protection safety harness or a SCBA harness, on the one hand and for a reliable and stable design of the deformable element on the other hand.

In one embodiment, the harness shock absorber assembly comprises an indicator for indicating a deformation of the deformable element. Such an indicator is of advantage as it provides for a reliable indication—independent of the optical appearance of the deformable element—of a deformation of the deformable element which has happened upon acting of a load on the personal protective equipment. In other words, even if the deformation of the deformable element is not visible to the user (any longer), e. g. for a deformable element which is elastically deformable and the deformation of the deformable element is reversible, respectively, there is an indication to the user that a deformation has happened. In some countries, personal protective equipment may underlie regulatory aspects and such a regulation may require that there is a reliable indication that a harness shock absorber has been activated.

In a certain embodiment, the indicator of the harness shock absorber assembly has a load threshold value for the load impact wherein the indicator indicates the load impacting onto the deformable element above the load threshold. Such a load threshold value is of advantage as the indicator does not indicate low impacts, i. e. impacts of a low load which may be considered uncritical. An indication provided by such an indicator means that the load was reasonably high and therefore it is important that the user is being informed about that.

In certain embodiments, the indication of the indicator of the harness shock absorber assembly is irreversible. That means that the indicator undergoes a shape, size and/or appearance change which irreversibly indicates a deformation of the deformable element of the shock absorber assembly to which the indicator belongs or to which the indicator is attached. Such an indicator is beneficial as the indication is permanently observable even if the deformable element is elastically deformable and returns to its shape and appearance after the load impact. Such an irreversible indicator may comprise an ink or a paint arranged on the surface of the deformable element, wherein the ink or paint exhibits optical defects after a load impact, e. g. cracks. It is also conceivable that the indicator comprises a mechanical indicator element, e. g. a thread or other thin structure which ruptures when a load is impacted on the shock absorber.

In certain embodiments, the indicator of the harness shock absorber assembly is attachable to the deformable element. Such an attachable indicator has the advantage that it can be replaced after indication and the deformable element is still usable with a new indicator. This is particularly useful if the deformable element is elastically deformable and the deformation is reversible. Also, the indicator may be replaced by another one, i. e. an indicator with different properties, e. g. different sensitivity. The shock absorber assembly and/or the indicator may comprise attachment means for attaching the indicator to the deformable element of the harness shock absorber assembly. The attachment. means may comprise a mechanical attachment means such as mechanical fasteners, snap fit or the like, an adhesive attachment means such as an adhesive layer or a combination thereof. The advantage of such an attachment means is that an easy and reliable way of attaching the indicator to the deformable element of the shock absorber is provided thereby. It is also conceivable that the indicator is attached to the deformable element of the harness shock absorber assembly by means of adhesive, which may provide for a releasable nor a non-releasable attachment of the indicator.

In a certain embodiment, the indicator of the harness shock absorber assembly is integral with the deformable element. For example, the indicator is formed as a protrusion of an edge of the deformable element, which may protrude from the edge into an opening present at the deformable element of the harness shock absorber assembly. Other arrangements are conceivable as well, for example an indicator arranged on the surface of the deformable element or protruding from an outer edge of the deformable element. Such an integral indicator has the advantage that no attachment means are required. Also, an easy, compact and robust arrangement of the indicator is provided thereby. Furthermore, an unwanted replacement of the indicator is prohibited thereby, which may in particular be required by regulations.

In one embodiment, the deformable element of the harness shock absorber or of the harness shock absorber assembly comprises a material which exhibits an initial reversible deformable behavior, wherein the deformation behavior changes to an irreversible deformation behavior for a continued deformation. For example, upon acting of a force or load to the harness shock absorber or harness shock absorber assembly, respectively, for example through a shock introduced into a flexible strap tightly wrapped around the deformable element, the deformation is reversible. If the force or load continues to act upon the deformable element, the deformation behavior changes to an irreversible deformation. Such a change of the deformation behavior is beneficial as the changed deformation behavior may represent an indication of a load or force acting upon the deformable element of the harness shock absorber or harness shock absorber assembly, respectively, over a certain period of time and/or with a certain strength or intensity. A separate indicator may not be necessary in such case for indicating the time or strength of the deformation. However, it is noted that such an arrangement may also be combined with a separate indicator being integral with the deformable element or separate therefrom, even if not absolutely necessary, e. g. to provide a specific indicator function.

In a further embodiment, the harness shock absorber assembly comprises a second strap comprising a middle portion and two protruding portions facing away from each other, wherein the middle portion of the second strap is tightly wrapped around the deformable element such that pulling the protruding portions away from each other deforms the deformable element. Such a solution is beneficial as a further strap may increase the safety of wearing and the wearing comfort.

In yet a further embodiment, the at least one strap of the harness shock absorber assembly is a ventral strap. Such a harness shock absorber assembly would provide for a reliable protection of the user or wearer.

In yet a further embodiment, the at least one strap of the harness shock absorber assembly is a shoulder strap. Such a harness shock absorber would provide for a reliable protection of the user or wearer.

In another embodiment, the fall protection safety harness comprises two straps and is configured so that when the harness is worn by a user, a first ventral strap of the harness extends from the right shoulder of the user to the right hip of the user and a second ventral strap of the harness extends from the left shoulder of the user to the left hip of the user. Such a fall protection harness provides for a reliable and secure design and provides for a good protection of the user or wearer.

In still another embodiment, the fall protection safety harness is configured so that when the harness is worn by a user, a first ventral strap of the harness extends from the right shoulder of the user to the left hip of the user and a second ventral strap of the harness extends from the left shoulder of the user to the right hip of the user. Such a fall protection harness provides for a reliable and secure design and provides for a good protection of the user or wearer.

In yet another embodiment, the fall protection harness comprises a harness shock absorber according to the present disclosure and a first and second ventral strap. The harness shock absorber of the harness shock absorber assembly comprises a first and a second buckle portion, wherein the first buckle portion of the fall protection safety harness is mounted on the first ventral strap and wherein the second buckle portion is mounted on the second ventral strap, the first and second buckle portions being detachably attached to each other to form a ventral buckle, wherein the first and second ventral straps and the first and second buckle portions are configured so that the ventral buckle is at least generally aligned with a sagittal plane of the user and harness. Such a fall protection harness provides for a reliable and secure design and provides for a good protection of the user or wearer.

In a further embodiment, the SCBA harness further comprises two shoulder straps and a waist strap. Such a SCBA harness provides for a reliable and secure design and provides for a good protection of the user or wearer.

In one embodiment, the harness shock absorber assembly may comprise a connection ring for connecting to a safety rope or lanyard of a crane or davit for carrying persons working at a certain height, e. g. by a hook. Such a connection ring may have the shape of a "D" and may therefore be referred to as "D-ring". The advantage of such a connection ring is that an easy and reliable connection between a fall protection safety harness and the harness shock absorber assembly is provided thereby.

The invention was described in various embodiments above. It is understood by a person skilled in the art, that one of, several of or all the above-mentioned embodiments can be combined with each other.

The invention will now be described in more detail with reference to the following Figures exemplifying particular embodiments of the invention:

BRIEF DESCRIPTION OF THE DRAWINGS

FIG. 1 shows in a schematic front view a fall protection safety harness 100 worn by a user 600. The fall protection safety harness 100 comprises a harness shock absorber assembly 10 according to one embodiment of the present disclosure and two flexible straps 16, 17 in the upper region 450 (i. e. each worn over one of the user's shoulders 610, 620 together forming the harness shock absorber assembly 10). The harness shock absorber 1 and the harness shock absorber assembly 10, respectively, comprises a deformable element 10*a* according to the present disclosure around which the two flexible straps 16, 17 are tightly wrapped. The deformable element 10*a* and the straps 16, 17 form the harness shock absorber assembly 100. The harness shock absorber assembly 10 may comprise a connection ring or D-ring (not shown here) for connecting to a safety rope or lanyard of a crane or davit for carrying persons working at a certain height. In the example shown, the two straps 16, 17 are wrapped around the deformable element 10*a* such that a so-called (pseudo-)crossover harness configuration of the fall protection safety harness 100 is formed. That is the first flexible strap 16 coming from the upper left area and going to the lower left area and vice versa for the second flexible strap 17. The harness shock absorber assembly 10 will be described in more detail below. The fall protection safety harness 100 further comprises two straps in the lower region 460 each worn around one of the user's hips 630, 640.

FIG. 2 is a schematic top view of an embodiment of the deformable element 10*a* of the harness shock absorber 1 according to the present disclosure. The harness shock absorber 1—as mentioned above—is part of the harness shock absorber assembly 10 and comprises a deformable element 10*a* having an elongated shape with a length l and a width w perpendicular to the length l. In the embodiment shown, the length l is approximately 3 times of the width w. Although not shown here, other configurations are conceivable with a different length-to-width ratio. The deformable element 10*a* of the harness shock absorber assembly 10 comprises a main body 12 and an opening 14 formed therein. The opening 14 may be formed by cutting out or punching the material of the main body 12. Alternatively, the main body 12 may be formed in a molding process, e. g. an injection molding process, wherein the opening 14 is directly formed together with the main body 12 in such a process. Upon deformation of the deformable element 10*a*, the main body 12 and/or the opening 14 will change their shape and appearance (not shown in FIG. 2, see FIGS. 4 and 5 or FIGS. 6 and 7). The harness shock absorber assembly 10 comprises the harness shock absorber 1 as shown and two flexible straps 16, 17, which are not shown here (please see FIG. 3). At the upper and lower perimeter of the deformable element 10*a*, towards the transverse sides of the deformable element 10*a*, strap guiding means 20 comprising a guiding arm 22 defining a slot 24 for receiving the strap 16 (not visible here) are arranged for guiding the straps 16, 17 (not shown) at the deformable element 10*a*. The strap guiding means 20 are explained in more detail below in FIG. 3. The deformable element 10*a* of the shock absorber 1 as shown further comprises an indicator 30 for indicating that a deformation of the deformable element 10*a* has happened. As can be seen, the indicator 30 comprises two protrusions 32*a*, 32*b* extending from the inner perimeter of the deformable element 10*a* into the opening 14. The protrusions 32*a*, 32*b* are connected to each other by connection 32*c*. A deformation of the deformable element 10*a* will lead to a movement of the protrusions 32*a*, 32*b* relative to each other such that the connection 32*c* therebetween is released, e. g. by breaking. Such a release can be observed, e. g. optically, by a user. The deformable element 10*a* also shows a further indicator 36, which may be arranged in addition to the indicator 30 or as an alternative thereto. In the example shown, the indicator 36 comprises an ink or paint which is arranged on the surface of the deformable element A deformation of the deformable element 10*a* leads to damage of the surface of the ink or paint such that cracks therein or the like occur. The indicator 36 in the example shown exhibits cracks 38 which occurred upon a deformation the deformable element 10*a* did undergo. Such cracks 38 can be observed, e. g. optically, by a user.

FIG. 3 is a schematic top view of an embodiment of the harness shock absorber assembly 10 according to the present disclosure. Similar to FIG. 2, the harness shock absorber assembly 10 comprises a deformable element 10*a* and has an elongated extension. The harness shock absorber 1—as mentioned above—is part of the harness shock absorber assembly 10. The deformable element 10*a* comprises a main body 12 and an opening 14 formed therein. In addition to the harness shock absorber 1 as shown in FIG. 2, the harness shock absorber assembly 10 as shown in FIG. 3 further comprises two flexible straps 16, 17 each having a middle portion 16*b* which is tightly wrapped around the deformable element 10*a* and two protruding portions 16*a* facing away from each other. It is understood that the two protruding portions 16*a* are sections or portions of the flexible straps 16, 17 and that the straps 16, 17 continue beyond the protruding portions 16*a*. The middle portion 16*b* of the straps 16, 17 is supported by the deformable element 10*a*. A part of the middle portion 16*b* of the strap 16 is on a first major surface of the deformable element 10*a*. The strap 16 further comprises two twisted portions 16*c* at which the strap 16 turns from a first major surface of the deformable element 10*a* to a second major surface opposite to the first major surface such that a part of the middle portion of the strap is on the opposite second major surface (underneath the deformable element 10*a* and thus not visible here) and vice versa. Although two twisted portions 16*c* are indicated in FIG. 3, it is noted that there may be more than two twisted portions 16*c* present at the straps 16, 17 depending on the number of windings of the strap 16 around the deformable elements 10*a* when tightly wrapping the strap 16 around the deformable element 10*a*. In the example shown in FIG. 3, there are two straps 16, 17 each with a middle portion 16*b* tightly wrapped around the deformable element 10*a*. As can be seen, the middle portions 16*b* of the two straps 16, 17 overlap with each other three times, i. e. two times on the first major surface (in FIG. 3 the top side or top view) of the deformable element 10*a* and one time on the second major surface thereof (in FIG. 3 the rear side or rear view, thus not visible here). Other configurations are conceivable, e. g. having more or less overlaps of the middle portions 16*b* of the straps 16, 17. Pulling the protruding portions 16*a* of a strap 16 away from each other deforms the deformable element 10*a* (deformation not shown here, see FIGS. 4 and 5 or 6 and 7). The protruding portions 16*a* of the straps 16, 17 each have a free length s protruding from the deformable element 10*a*. The protruding portion 16*a* is not supported by the deformable element 10*a*. Upon deformation of the deformable element 10*a*, the middle portion 16*b* of the straps 16, 17 moves relative to the surface of the deformable element 10*a* in a direction along the extension of the strap 16. In other words, the middle portion 16*b* slides on the surface of the deformable element 10*a* such that the length s of the protruding portion 16*a* protruding from the deformable element 10*a* increases to the protruding length s' (not shown here, see FIGS. 6 and 7). As can be seen from FIG. 3, the protruding portions 16*a* of the flexible strap 16 protrude from the deformable element 10*a* at different sides thereof. In the example shown, the strap 16 starts on the lower left side having a protruding portion 16*a* there. After wrapping around for providing the middle portion 16*b* being supported by the deformable element 10*a* and having two twisted portions 16*c*, the strap continues to the upper right side having a protruding portion 16*a* there as well, which is—relative to the other protruding portion 16*a* on the lower left side—at a different side of the deformable element 10*a*. The arrangement of the protruding portions of the second flexible strap 17 is similar (not indicated with reference signs here). Similar to FIG. 2, the deformable element 10*a* comprises strap guiding means 20 which is formed by a guiding arm 22 defining a slot 24 for receiving the strap 16. As shown, the strap 16 extends through the slot 24 and is kept in place by the guiding arm 22. It is noted that the contact between the guiding arm 22 and the strap 16 is tight, but not so strong that a movement of the strap through the slot 24 of the guiding means 20 is substantially inhibited. Such a strap guiding means 20 with its guiding arm 22 may be formed by cutting out a portion of the main body 12 of the deformable element 10*a* to form the slot 24 and thereby the guiding arm 22. It is also conceivable to make the strap guiding means 20 by a molding process, e. g. an injection molding process, preferably at the same time when the main body 12 of the deformable element 10*a* is formed. Although shown with one end open, the slot 24 may also be defined by the guiding arm 22 such that the slot 24 is closed on the other end, i. e. the guiding arm 22 is connected to the main body 12 of the deformable element 10 on both sides or ends thereof.

FIG. 4 is a schematic top view of the deformable element 10*a* of the harness shock absorber 1 according to the present disclosure in a non-deformed condition. As mentioned above, the harness shock absorber 1 is part of the harness shock absorber assembly 10. The deformable element 10*a* has—prior to deformation, i. e. in a non-deformed condition—a width w. The straps 16, 17 are only schematically illustrated here as arrows, wherein the strap 16 has two protruding portions 16*a* each with a protruding length s (only indicated for one strap 16 here). FIG. 4 further illustrates the support distances d1, d2, d3 over which the middle portion 16*b* (not shown here) of the straps 16 is supported by the deformable element 10*a*. Although only indicated for the width w, as mentioned above, also other dimensions of the deformable element 10*a* may decrease upon deformation thereof.

FIG. 5 is a schematic top view of the deformable element 10*a* of the harness shock absorber 1 in a deformed condition, e. g. when a load had acted or is acting on the straps 16, 17 such that the protruding portions 16*a* of the strap 16 are pulled away from each other. As mentioned above, the harness shock absorber 1 is part of the harness shock absorber assembly 10. FIG. 5 further illustrates the reduced support distances d1', d2', d3' over which the middle portion 16*b* of the straps is supported by the deformable element 10*a*. The deformable element 10*a* has—in the deformed condition—a width w'. Due to the deformation of the deformable element 10*a*, the width w' is smaller than the width w of the deformable element 10*a* in the non-deformed condition as illustrated in FIG. 4 above. The straps 16, 17 are only schematically illustrated here as arrows, wherein the strap 16 has two protruding portions 16*a* with a prolonged protruding length s' (only one is indicated here). This is because the middle portion 16*b* of the strap 16 has moved relative to the surface of the deformable element 10*a* and at least one of the support distances d1', d2', d3', over which the strap 16 is supported on the deformable element 10*a*, has been decreased. In the example shown, in particular support distance d1' has been decreased in the deformed condition of the deformable element 10*a* relative to the support distance d1 of the deformable element 10*a* in the non-deformed condition as shown in FIG. 4. This leads to an increase in length s' compared to the length s in FIG. 4. Although not illustrated here, other dimensions of the deformable element 10*a* may also be decreased, e. g. the length l' or the support distances d2', d3' relative to the length l or the support distances d2, d3 as shown on FIG. 4, at the same time.

FIGS. 6 and 7 are schematic top views of the harness shock absorber 1 as part of the harness shock absorber assembly 10 as shown in FIG. 3 with its deformable element 10*a* and with two straps 16, 17 arranged on the deformable element 10*a* such that the middle portion 16*b* is tightly wrapped around the deformable element 10*a*. As can be seen, the straps 16, 17 each further comprise two protruding portions 16*a* (only one of which is indicated with 16*a*) having a protruding length s as well as two twisted portions 16*c*. It is noted that the protruding portions 16*a*—as mentioned above—only indicate a section or portion of the flexible straps 16, 17. Similar to FIGS. 4 and 5, FIGS. 6 and 7 show the deformable element 10*a* and the dimensions width w and the support distances d1, d2, d3 in the non-deformed condition (FIG. 6) and the dimensions width w' and the support distances d 1', d2', d3' in the deformed condition (FIG. 7) of the deformable element 10*a*. As can be seen from FIGS. 6 and 7. the width w' and the support distances d1', d2', d3' of FIG. 7 are smaller compared to the width w and the support distances d1, d2, d3 of FIG. 6. Although not illustrated in FIGS. 6 and 7, also the length I of the deformable element 10*a* in the non-deformed condition (FIG. 6) may decrease to the length of the deformable element 10*a* in the deformed condition (FIG. 7). Similar to FIGS. 4 and 5, FIGS. 6 and 7 illustrate the protruding length s of the strap 16 when the deformable element 10*a* is in a non-deformed condition (FIG. 6) which increases to the prolonged protruding length s' of the strap 16 when the deformable element 10*a* is in a deformed condition (FIG. 7). It is noted that—although such an arrangement is only illustrated for one protruding portion 16*a* of the strap 16—the other protrusions may similarly exhibit an increased protruding length s' of the protruding portion 16 of the straps 16, 17 when the deformable element 10*a* is in the deformed condition relative to the protruding length s of the protruding portion 16*a* of the straps 16, 17 when the deformable element 10*a* is in the non-deformed condition. FIGS. 6 and 7 also show the strap guiding means 20 comprising the guiding arm 22 defining the slot 24 for guiding the flexible straps 16, 17 at the deformable element 10.

FIGS. 8 and 9 are schematic top views of the deformable element 10*a*' according to a further embodiment of the harness shock absorber 1' of the present disclosure. Similar to as mentioned above, the harness shock absorber 1' is part of the harness shock absorber assembly 10' which is formed by the harness shock absorber 1' together with the flexible straps 16, 17 (not shown here). The deformable element 10*a*' of FIGS. 8 and 9 is generally similar to the deformable element 10*a* as shown in FIG. 2 except that the indicator 30' here is different compared to the indicator 30 as shown on FIG. 2. The indicator 30' is separate from the deformable element 10*a*' here, whereas the indicator 30 shown in FIG. 2 is integral with the main body 12 of the deformable element 10*a*. The deformable element 10*a*' as shown here also comprises a main body 12' and an opening 14' formed therein. Shape and function of the main body 12' and the opening 14' as shown here are similar to the main body 12 and the opening 14' as shown in FIG. 8. The indicator 30' comprises two protrusions 32*a*', 32*b*' into an opening 32' formed within the indicator 30'. The two protrusions 32*a*', 32*b*' are connected to each other by connection 32*c*', which is being released upon deformation of the deformable element 10*a*' (not shown here). The indicator 30' further comprises attachment means 34*a*' for engaging with corresponding attachment means 34*b*' arranged on the main body 12' of the deformable element 10*a*' for attaching the indicator 30' to the deformable element 10*a*'. It is noted that the attachment may be releasable, i. e. disconnectable, or non-releasable, i. e. permanent or not disconnectable. FIG. 9 shows the indicator 30' attached to the main body 12' of the deformable element 10*a*' with the attachment means 34*a*' and 34*b*' engaged with each other. FIGS. 8 and 9 show four attachment means 34*a*', 34*b*'. Other configurations with more or less attachment means are conceivable as well. A further alternative of attachment means is shown below in FIGS. 10A and 11A. Further details of the indicator 30' are also shown in and described for FIGS. 12A, 12B. It is noted that the details of the harness shock absorber 1 or of the harness shock absorber assembly 10 as shown above are also conceivable to be present here.

FIGS. 10A and 11A are schematic top views of the deformable element 10*a*" of the harness shock absorber 1" with alternative attachment means 34" for the indicator 30". Similar to as mentioned above, the harness shock absorber 1" is part of the harness shock absorber assembly 10" which is formed by the harness shock absorber 1" together with the flexible straps 16, 17 (not shown here). The indicator 30" is similar in structure and function regarding the indicator 30, 30' as shown in FIGS. 2, 8 and 9 above, i. e. the indicator 30" comprises two protrusions 32*a*", 32*b*" extending into an opening 32" and connected to each other by a connection 32*c*". Similar to the above-described indicators 30, 30', the connection 32*c*" of indicator 30" is being released upon deformation of the deformable element 10*a*". As can be seen, the indicator 30" does not have explicit attachment means arranged thereon except the outer perimeter region 34*a*" thereof, which is engaged by attachment means 34" of the main body 12" of the deformable element 10*a*". FIG. 10A shows the indicator 30" in a not-attached condition, whereas FIG. 11A shows the indicator 30" attached to the main body 12" of the deformable element 10*a*". In this attached condition, the attachment means 34" with its two legs 34*b*' forming a gap 34*c*" therebetween engage the outer perimeter region 34*a*" of the indicator 30". It is noted that the thickness of the indicator element and the gap 34*c*" between the two legs 34*b*" of the attachment means 34" are configured and arranged such that—when the indicator 30" is attached and the outer perimeter region 34*a*" is introduced into the gap 34*c*"—a tight fit or clamping is provided in order to keep the indicator 30" securely in place. Other configurations are conceivable as well, for example an increased friction of the surfaces to enhance the attachment. It is also conceivable to provide an adhesive between the surfaces to further enhance the attachment. Similar to FIGS. 2, 8 and 9, an opening 14" formed in the main body 12" of the deformable element 10*a*" is shown here. Shape and function of the main body 12" and the opening 14" as shown here are similar to the main body 12, 12' and the opening 14, 14' of the deformable elements 10*a*, 10*a*' as shown in FIGS. 2, 8 and 9. FIGS. 10B and 11B illustrate in a schematic cross-sectional view the main body 12" with the attachment means 34" (FIG. 10B) and the engagement of the outer perimeter region of the indicator 30" by the attachment means 34" according to the cut A-A as indicated in FIGS. 10A and 10B. As can be seen, the attachment means 34" has two legs 34*b*" forming a gap 34*c*" therebetween for receiving the outer perimeter region 34*a*" of the indicator 30" (FIG. 11B). As mentioned above, the attachment means 34" and the outer perimeter region 34*a*" of the indicator 30" are configured and arranged to provide a reliable fit such that the indicator 30" is securely kept in place. It is noted that the attachment may be releasable, i. e. disconnectable, or non-releasable, i. e. permanent or not disconnectable. It is also noted that the details of the harness shock absorber 1, 1', 1" and of the harness shock absorber assembly 10 as shown above are also conceivable to be present here.

FIGS. 12A and 12B are schematic top views of the indicator 30' as illustrated above in FIGS. 14 and 15. FIG. 12A shows the indicator 30' in a first condition, i. e. prior to the deformation of the deformable element 10*a*' of the harness shock absorber 1' (both not shown here, see FIGS. 8 and 9), i. e. with the deformable element 10*a*' in a non-deformed condition. As can be seen, the connection 32*c*' between the two protrusions 32*a*', 32*b*' is intact. FIG. 12B shows the indicator 30' in a second condition when a deformation of the deformable element 10*a*' of the shock absorber 1' has happened, i. e. with the deformable element 10*a*' in a deformed condition. Here, the connection 32*c*' has been broken as indicated by the two remaining portions 33*a*', 33*b*', which previously had formed the connection 32*c*'. Although the details of the connection 32*c*' are illustrated for the separate indicator 30' here, the same applies to other indicators 30, for example an alternative separate indicator 30" as shown in FIGS. 10A, 11A or an integrated indicator 30 as shown in FIG. 2. It is further noted that the connection 32*c*, 32*c*', 32*c*", which is formed as a bar between the two protrusions 32*a*, 32*b*, 32*a*', 32*b*', 32*a*", 32*b*" and which may be integral with these, may be formed in a different way. For example, the connection 32*c*, 32*c*', 32*c*" may have a different shape and/or may be a separate part which is attached to the two protrusions 32*a*, 32*b*, 32*a*', 32*b*', 32*a*", 32*b*". Suitable attachment means may be present in such a case. It is noted that the details of the harness shock absorber 1, 1', 1" and of the harness shock absorber assembly 10 as shown above are also conceivable to be present here.

FIG. 13 shows in a schematic front view the fall protection safety harness 111 worn by a user 600. The fall protection safety harness 111 comprises two shoulder straps 16, 17 in the upper region 450 (i. e. each worn over one of the user's shoulders 610, 620) and a harness shock absorber assembly 110 according to one embodiment of the present disclosure with two deformable elements 110A, 110B forming—together with the flexible straps 16, 17—the harness shock absorber assembly 110. The fall protection safety harness 111 also comprises a buckle having a first and second connectable buckle part connection between the two shoulder straps 16, 17 such that a so-called pseudo-cross-over harness configuration is formed. The straps 16, 17 together with the deformable elements 110A, 110B form the strap 20 of the harness shock absorber assembly 110. One of the buckle parts comprises a connection ring or D-ring 410 for connecting to a safety rope or lanyard of a crane or davit for carrying persons working at a certain height. Each of the two shoulder straps 16, 17 comprise a harness shock absorber assembly 110 according to the present disclosure. The harness shock absorber assembly 110 will be described in more detail below. The fall protection safety harness 111 further comprises two straps in the lower region 460 each worn around one of the user's hips 630, 640.

FIG. 14 shows in a schematic perspective view the harness shock absorber assembly 210 with its deformable element 210*a* according to an embodiment of the present disclosure in more detail. In addition to the harness shock absorber assemblies as shown and described above, the harness shock absorber assembly 210 comprises a connection ring 410 for connecting to a safety rope or lanyard of a crane or davit for carrying persons working at a certain height, e. g. by a hook (not shown here). The connection ring 410 comprises a ring structure 420 with an opening 430 formed therein. A hook or the like of a safety rope (not shown here) may engage with the opening 430. The connection ring 410 further comprises a base 440 engaged by the straps 16, 17 of the harness shock absorber assembly 210 such that the connection ring 410 is fixed to the harness shock absorber assembly 210 thereby such that a movement away from the harness shock absorber assembly 210 is inhibited. It is noted that the connection ring 410 may have some freedom to move, e. g. rotate relative to the deformable element 210*a* of the harness shock absorber assembly 210. Also, a slight translational movement in a direction substantially parallel to the deformable element 210*a* may be possible, depending on the tension applied by the straps 16, 17 onto the base 440 of the connection ring 410 and the deformable element 210*a*, respectively.

FIG. 15 shows in a schematic perspective view the harness shock absorber assembly 210' with its deformable element 210*a*' according to an embodiment of the present disclosure in more detail. The embodiment as shown in FIG. 15 is similar to the embodiment as shown in FIG. 14 and also comprises a connection ring 410' for connecting to a safety rope or lanyard of a crane or davit for carrying persons working at a certain height, e. g. by a hook (not shown here). The difference to the embodiment of FIG. 14 is, that the shape of the connection ring 410' here is different to the connection ring 410 as shown in FIG. 14. The connection ring 410' comprises a ring structure 420' with an opening 430' formed therein. As mentioned above, the shape of the ring structure 420' and the opening 430' formed therein, respectively, is different compared to the ring structure 420 and the opening 430 formed therein, respectively, as shown in FIG. 14. A hook or the like of a safety rope (not shown here) may engage with the opening 430'. The connection ring 410' further comprises a base 440' engaged by the straps 16, 17 of the harness shock absorber assembly 210' such that the connection ring 410' is fixed to the shock absorber assembly 210' thereby such that a movement away from the harness shock absorber assembly 210' is inhibited. It is noted that the connection ring 410' may have some freedom to move, e. g. rotate relative to the deformable element 210*a*' of the harness shock absorber assembly 210'. Also, a slight translational movement in a direction substantially parallel to the deformable element 210*a*' may be possible, depending on the tension applied by the straps 16, 17 onto the base 440' of the connection ring 410' and the deformable element 210*a*', respectively.

FIG. 16 shows in a schematic front view a self-contained breathing apparatus (SCBA) harness 500 comprising a pressure vessel (not visible here) at a rear side thereof, two shoulder straps 16', 17' in the upper region and a waist strap 18' in the lower region. The straps 16', 17' together with the deformable element 310*a* form the harness shock absorber assembly 310. It is understood that the harness shock absorber assembly 310 of the SCBA harness may have some similarity in structure and function to the harness shock absorber assembly of the fall protection safety harnesses 100, 111 as shown and described above. The SCBA harness further comprises a breathing device 510 connected to the pressure vessel by a breathing hose 516 and a control unit 520, e. g. to display and/or control conditions of the pressure vessel. FIG. 16 also shows the connection ring or D-ring 410' of the SCBA harness 500 which is similar in shape and/or function as the connection rings or D-rings as described above for FIGS. 13 to 15.

FIGS. 17 and 18 are schematic views of an embodiment of the harness shock absorber assembly 310 of the present disclosure for a SCBA harness 500 as shown in FIG. 16. FIG. 17 represents a front view of the harness shock absorber assembly 310, whereas FIG. 18 represents a rear view thereof. The SCBA harness 500 comprises two flexible straps 16', 17' assembled to the deformable element 310*a* thereby forming the harness shock absorber assembly 310. The deformable element 310*a* comprises a main body 312 and an opening 314 formed therein. The flexible straps 16', 17' are wrapped around a portion of the deformable element 310 several times such that a zigzag pattern is formed. Similar to the embodiment of the harness shock absorber 1 as shown in FIGS. 2 and 3, strap guiding means 320 are arranged at the perimeter of the deformable element 320 for guiding the flexible straps 16', 17' such that a strap movement is possible in a direction of the main extension of the flexible straps 16', 17', but a movement perpendicular thereto is inhibited. The strap guiding means 320 are formed by a guiding arm 322 defining an opening or slot 324 in the main body 312 of the deformable element 310*a* in a similar way as described for the strap guiding means 20 as described for FIGS. 2 and 3, except that the slot 324 is not open on one end. However, although not shown, it is conceivable that the slot 324 is open on one end. In the example shown, the first flexible strap 16' starts in the upper right area of the deformable element 310*a* and ends in the lower left area thereof, whereas the second flexible strap 17' starts in the upper left area of the deformable element 310*a* and ends in the lower right area thereof.

FIGS. 19 and 20 are schematic views of an embodiment of the harness shock absorber assembly 310' according to a different embodiment of the present disclosure for a SCBA harness 500 as shown in FIGS. 16, 17 and 18. FIG. 19 is a front view and FIG. 20 is a rear view of the harness shock absorber assembly 310'. Different to the embodiment of FIGS. 16 to 18, the harness shock absorber assembly 310' is only formed by one flexible strap 16" tightly wrapped around the deformable element 310*a*' as follows. The flexible strap 16" starts at the upper left area of the deformable element 310*a*' and is wrapped around a portion thereof several time such that a zigzag structure is formed. Once the flexible strap 16" is at the lower area, the same flexible strap 16" returns to the upper area of the deformable element 310*a*' in the same way, i. e. forming a zigzag structure as shown in FIGS. 19 and 20, until it reaches again the upper area, in this case the upper right area, of the deformable element 310*a*'. In addition to the flexible strap 16", a waist strap 18' is arranged in the lower area of the deformable element 310*a*', wherein the waist strap 18' has no connection to the flexible strap 16" wrapped around a portion of the deformable element 310*a*'. It is noted that the deformable element 310*a*'—similar to the deformable element 310*a* as shown in FIGS. 16 to 18, also comprises a main body 312' with an opening 314' formed therein. Similar to the embodiment of the harness shock absorber as shown in FIGS. 2 and 3 and to the embodiment of the harness shock absorber assembly 310 as shown in FIGS. 17 and 18, strap guiding means 320' are arranged at the perimeter of the deformable element 320' for guiding the flexible strap 16" such that a strap movement is possible in a direction of the main extension of the flexible strap 16", but a movement perpendicular thereto is inhibited. The strap guiding means 320' are formed by a guiding arm 322' defining an opening or slot 324' in the main body 312' of the deformable element 310*a*' in a similar way as described for the strap guiding means 20 as described for FIGS. 2 and 3, except that the slot 324' is not open on one end. However, although not shown, it is conceivable that the slot 324' is open on one end. Although not indicated in FIGS. 19 and 20, strap guiding means may be arranged for the waist strap 18' as well in a similar way as the strap guiding means 320' for the flexible strap 16".

Figure 1:
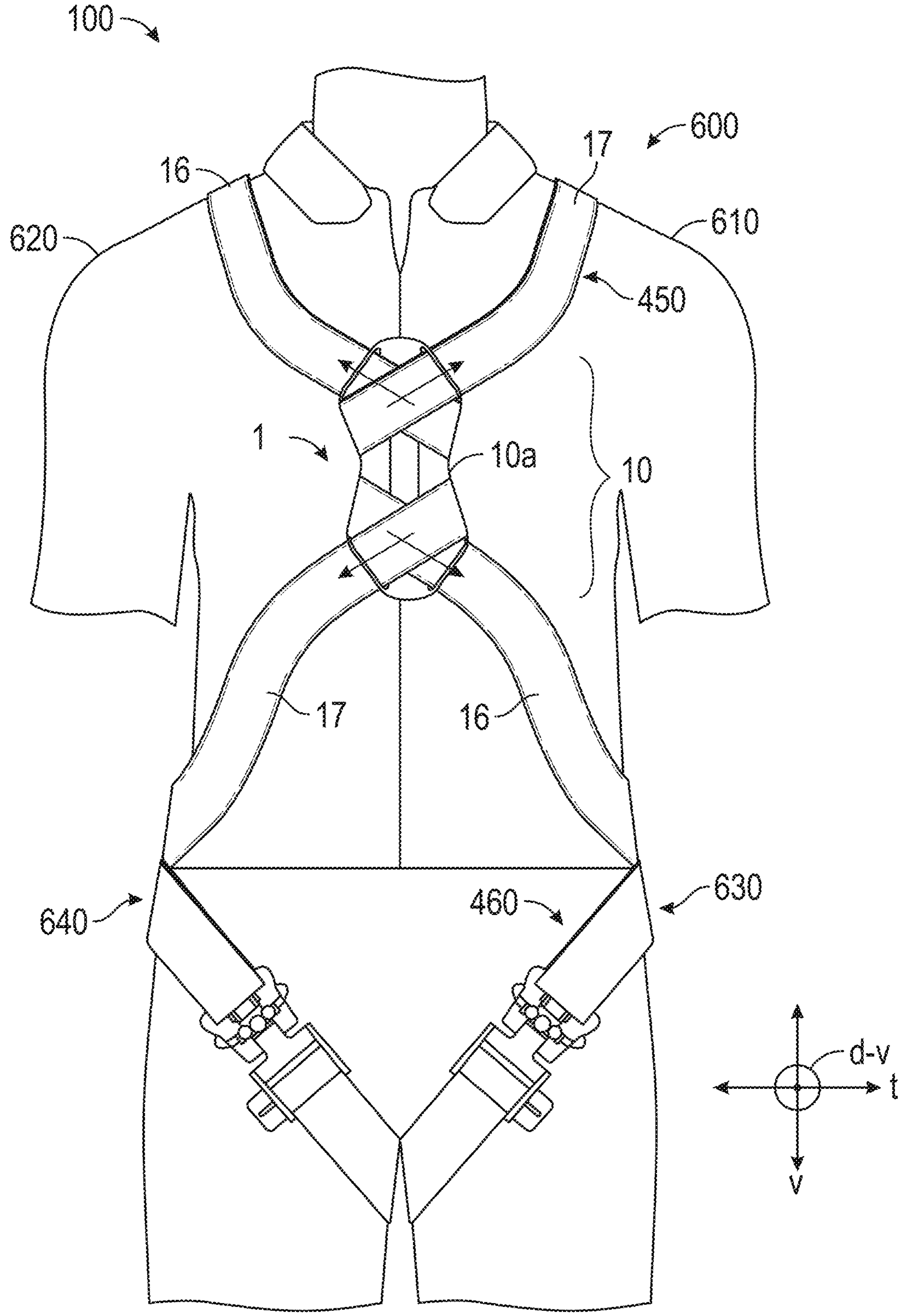
FIG. 1 is a schematic front view of a fall protection safety harness according to one embodiment of the present disclosure worn by a user.
Figure 2:
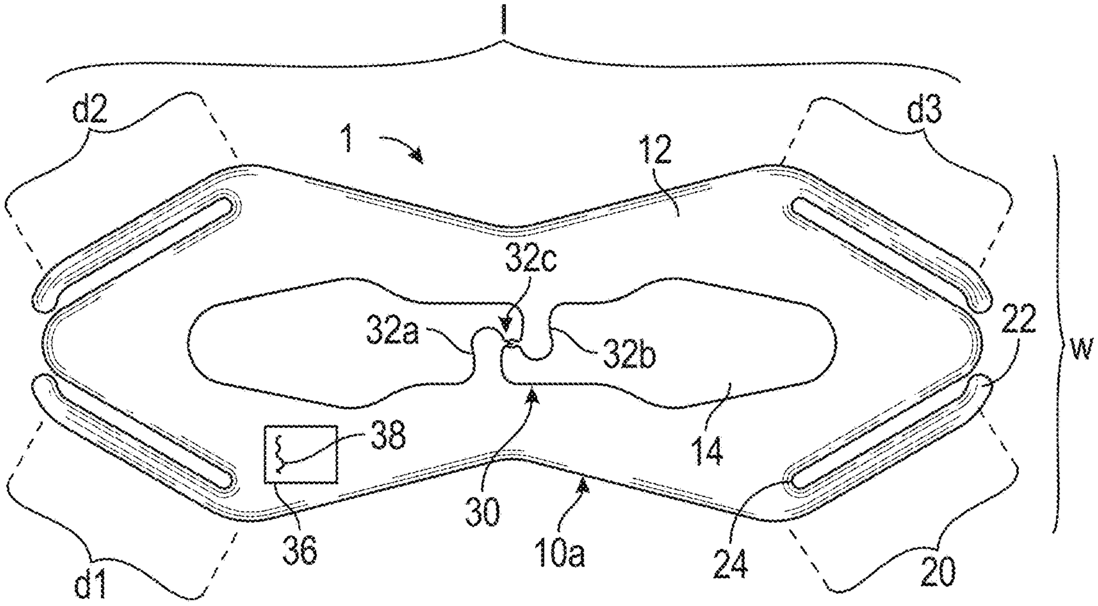
FIG. 2 is a schematic top view of an embodiment of the deformable element of the harness shock absorber assembly according to the present disclosure.
Figure 3:
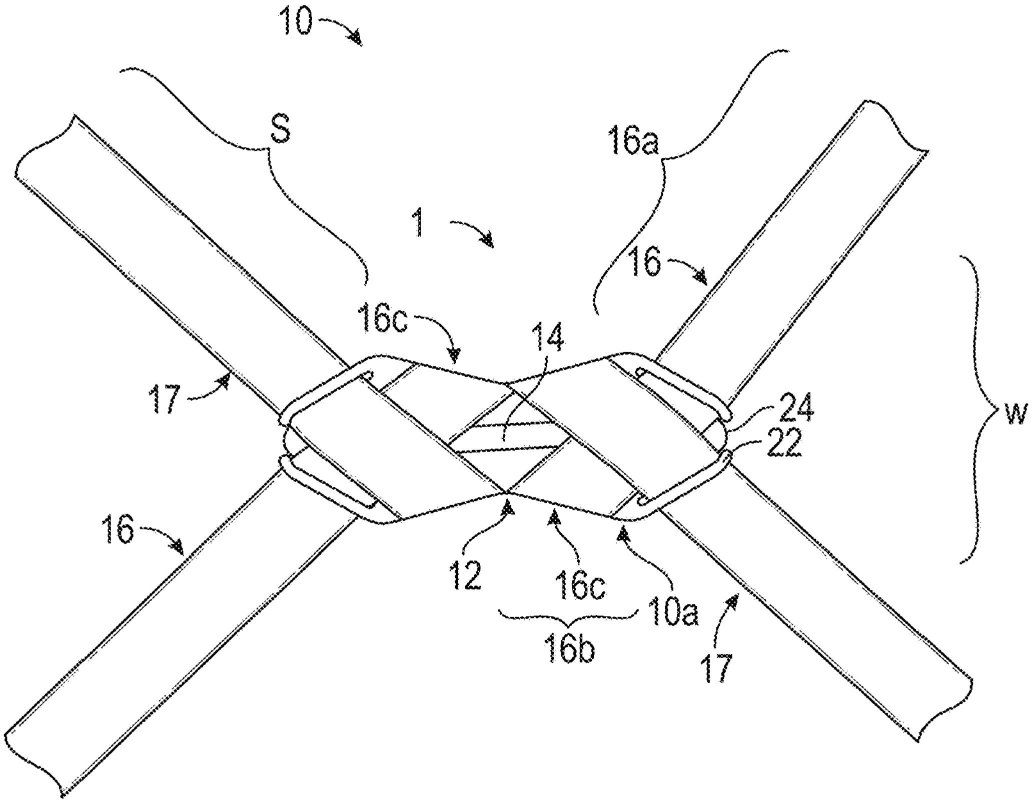
FIG. 3 is a schematic top view of an embodiment of the harness shock absorber assembly according to the present disclosure with two flexible straps assembled to the deformable element.
Figure 4:
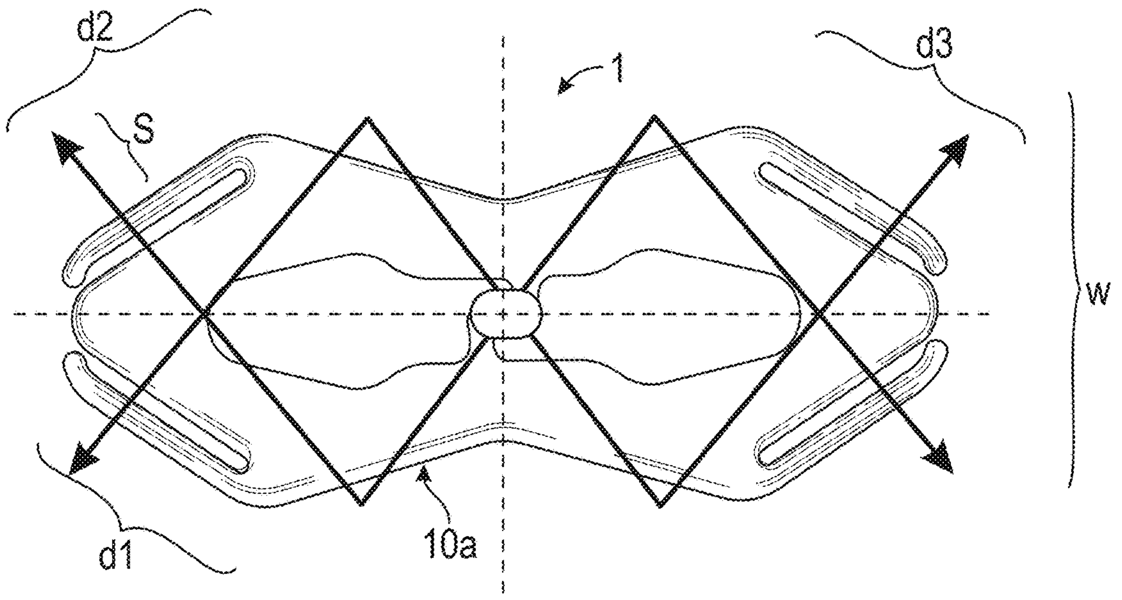
FIG. 4 is a schematic top view of the deformable element of the harness shock absorber assembly as shown in FIG. 2 with the deformable element being in a non-deformed condition.
Figure 5:
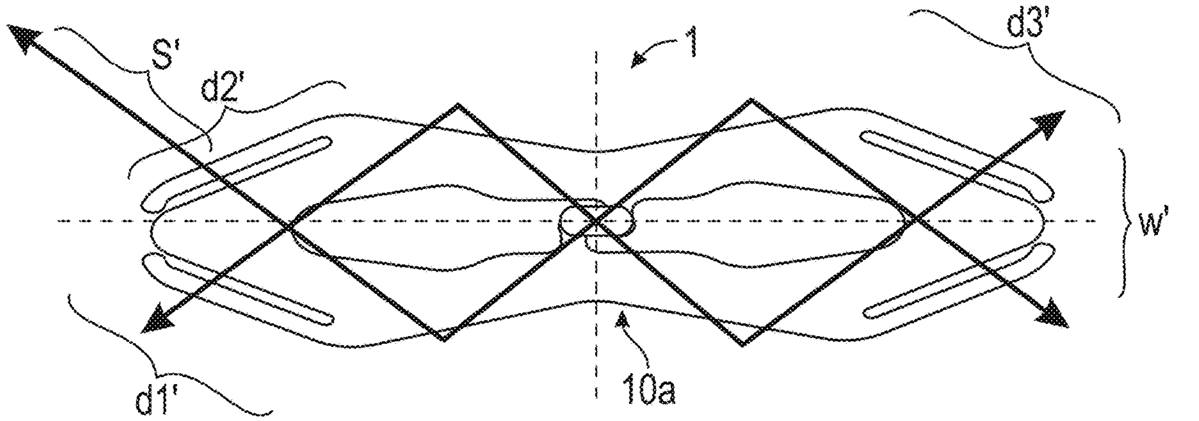
FIG. 5 is a schematic top view of the deformable element of the harness shock absorber assembly as shown in FIG. 2 with the deformable element being in a deformed condition.
Figure 6:
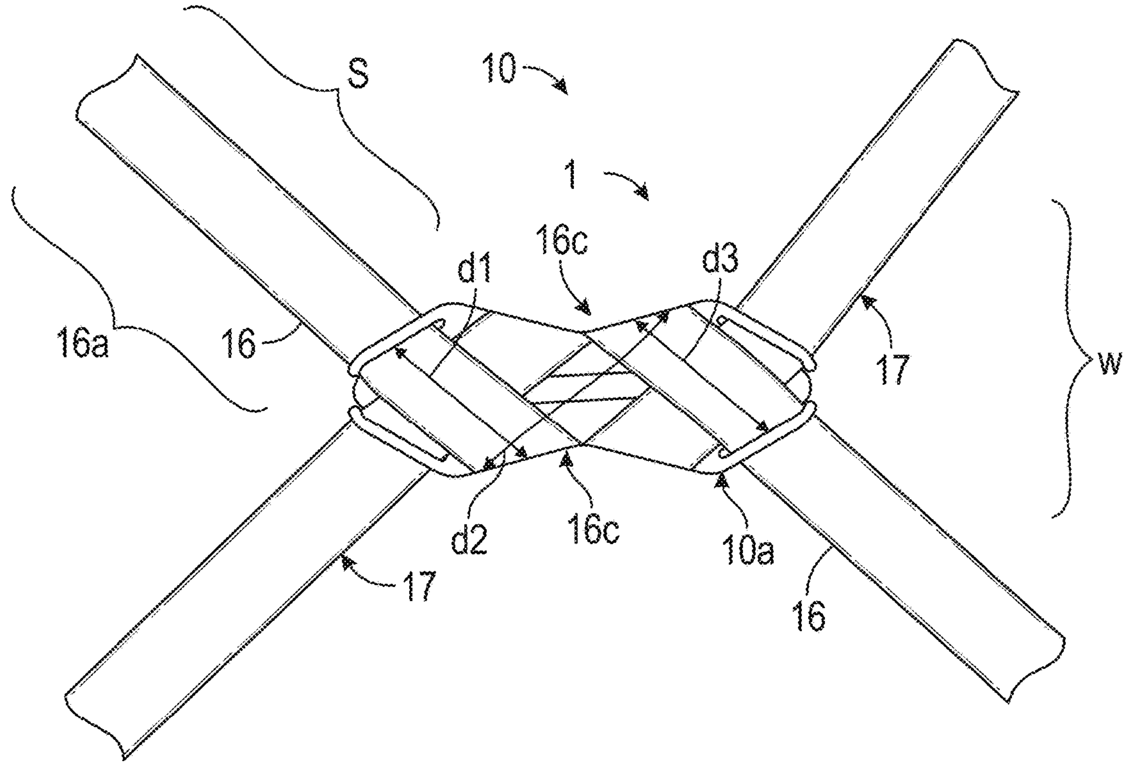
FIG. 6 is a schematic top view of the harness shock absorber assembly assembled with two flexible straps as shown in FIG. 3 with the deformable element being in a non-deformed condition.
Figure 7:
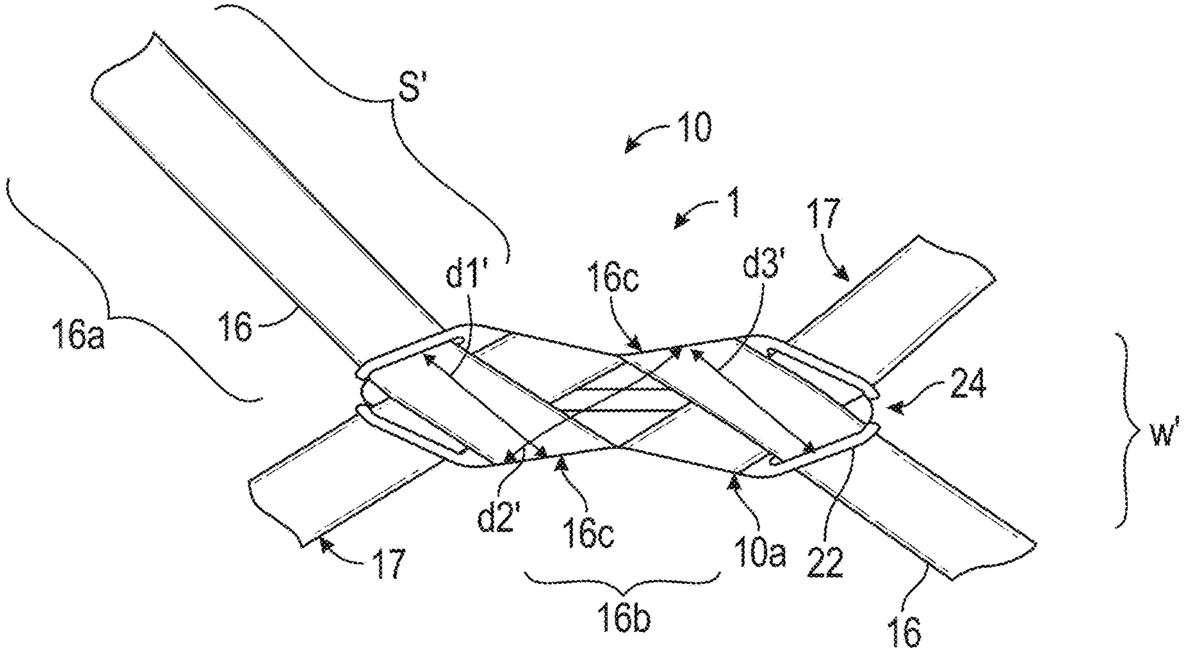
FIG. 7 is a schematic top view of the harness shock absorber assembly assembled with two flexible straps as shown in FIG. 3 with the deformable element being in a deformed condition.
Figure 8:
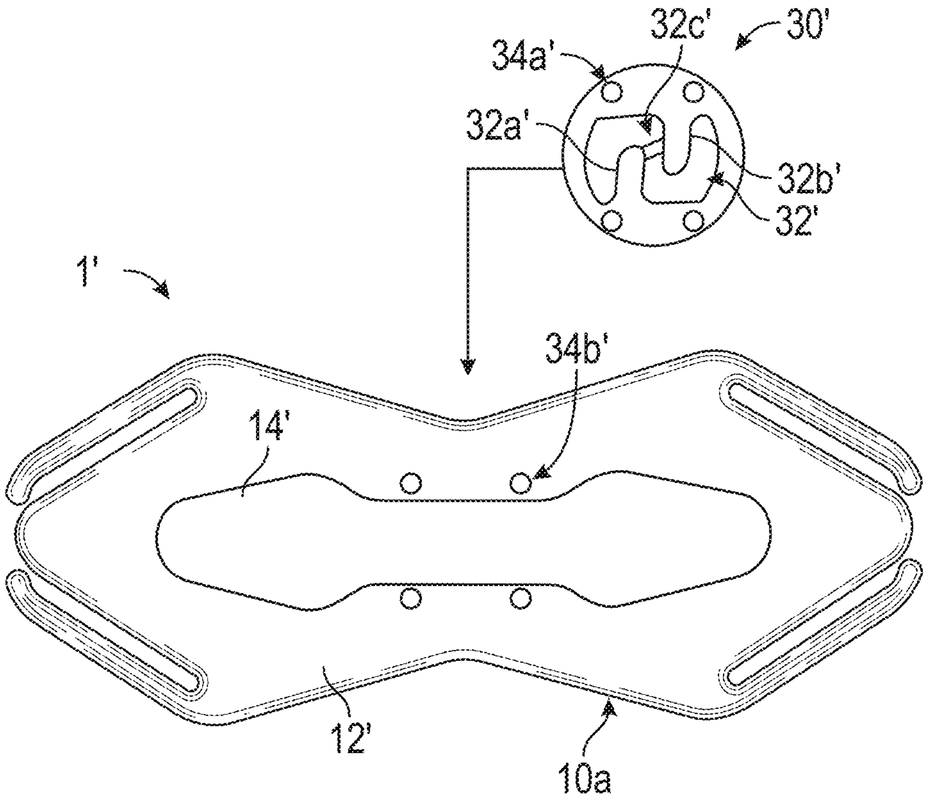
FIG. 8 is a schematic top view of the deformable element of the harness shock absorber assembly according to another embodiment and an indicator attachable thereto.
Figure 9:
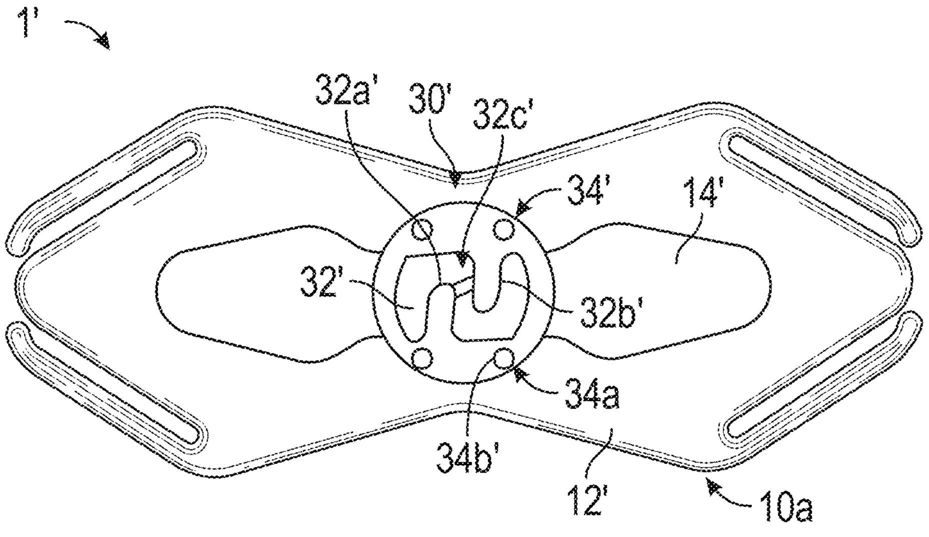
FIG. 9 is a schematic top view of the deformable element of the harness shock absorber assembly as shown in FIG. 8 with the indicator attached thereto.
Figure 10A:
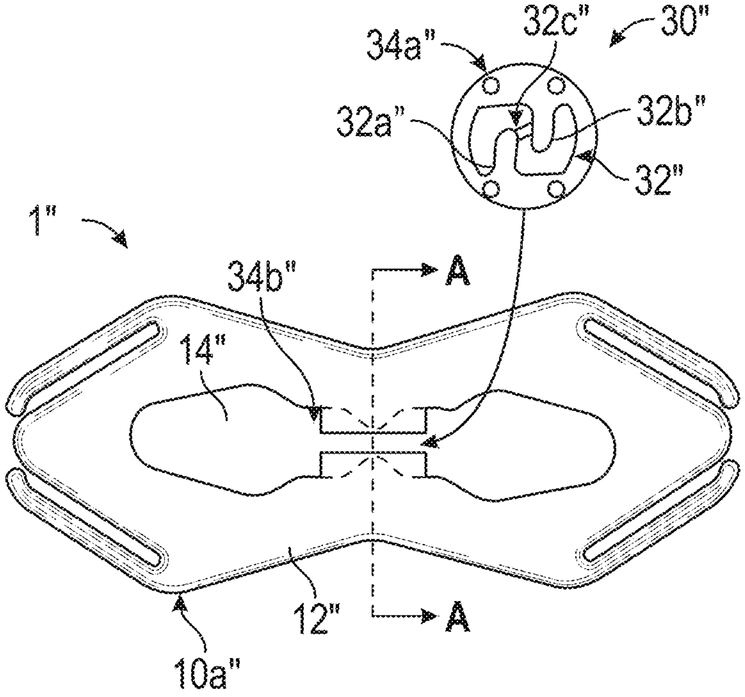
FIG. 10A is a schematic top view of the deformable element of the harness shock absorber assembly according to another embodiment and an indicator attachable thereto.
Figure 10B:
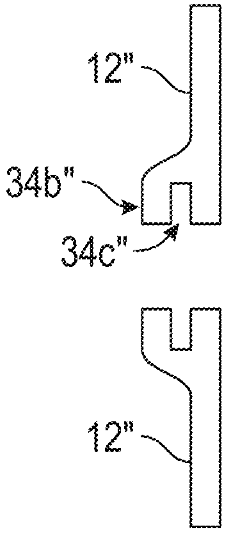
FIG. 10B is a cross-sectional view of the deformable element of the harness shock absorber assembly as shown in FIG. 10A.
Figure 11A:
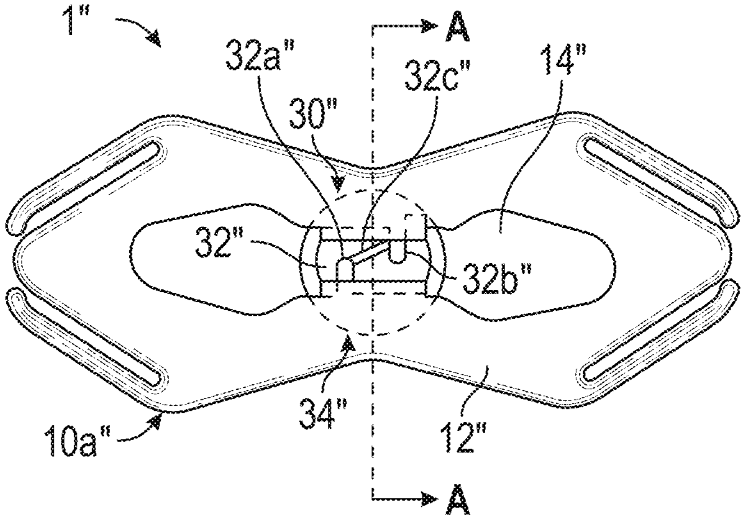
FIG. 11A is a schematic top view of the deformable element of the harness shock absorber assembly as shown in FIG. 10A with the indicator attached thereto.
Figure 11B:
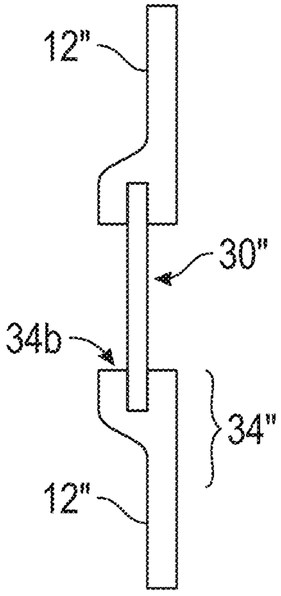
FIG. 11B is a cross-sectional view of the deformable element of the harness shock absorber assembly as shown in FIG. 11A with the indicator attached thereto.
Figure 12A:
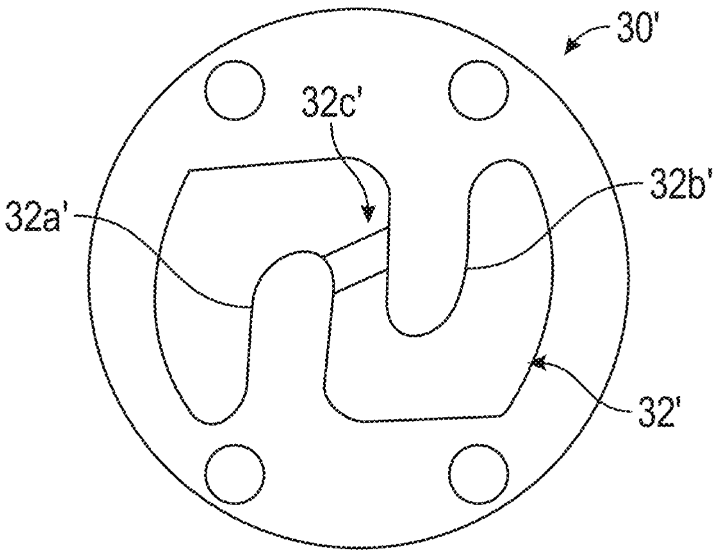
FIG. 12A is a schematic top view of the indicator of the harness shock absorber assembly according to an embodiment of the present disclosure as shown in FIGS. 8 and 9, in a first condition.
Figure 12B:
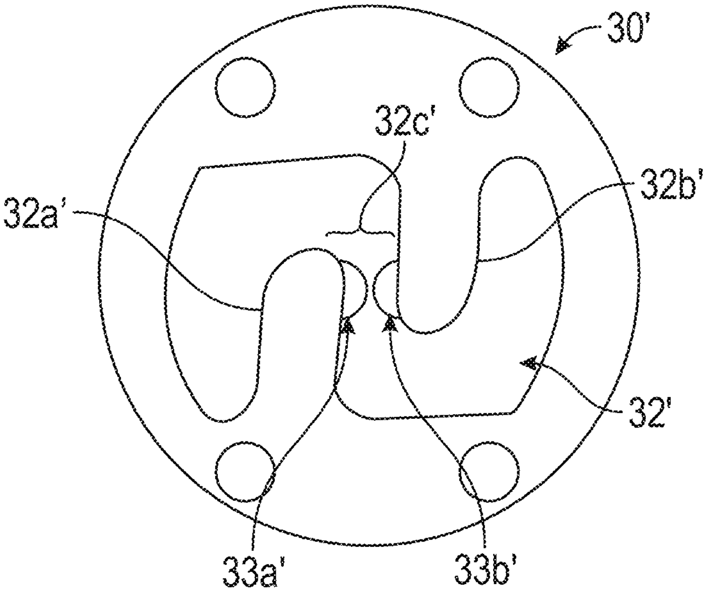
FIG. 12B is a schematic top view of the indicator of the harness shock absorber assembly according to an embodiment of the present disclosure as shown in FIGS. 8 and 9, in a second condition.
Figure 13:
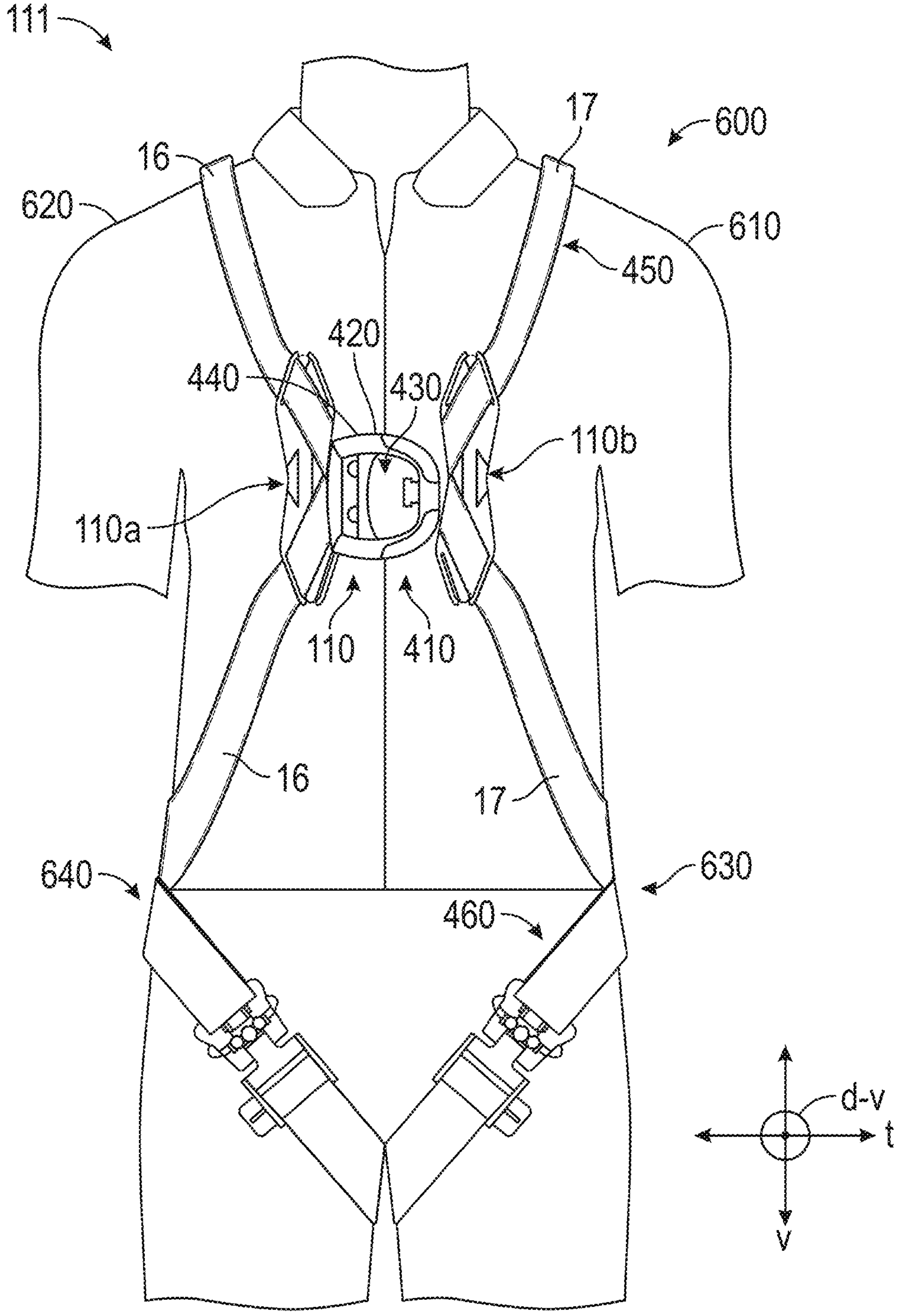
FIG. 13 is a schematic front view of a fall protection safety harness according to one embodiment of the present disclosure worn by a user.
Figure 14:
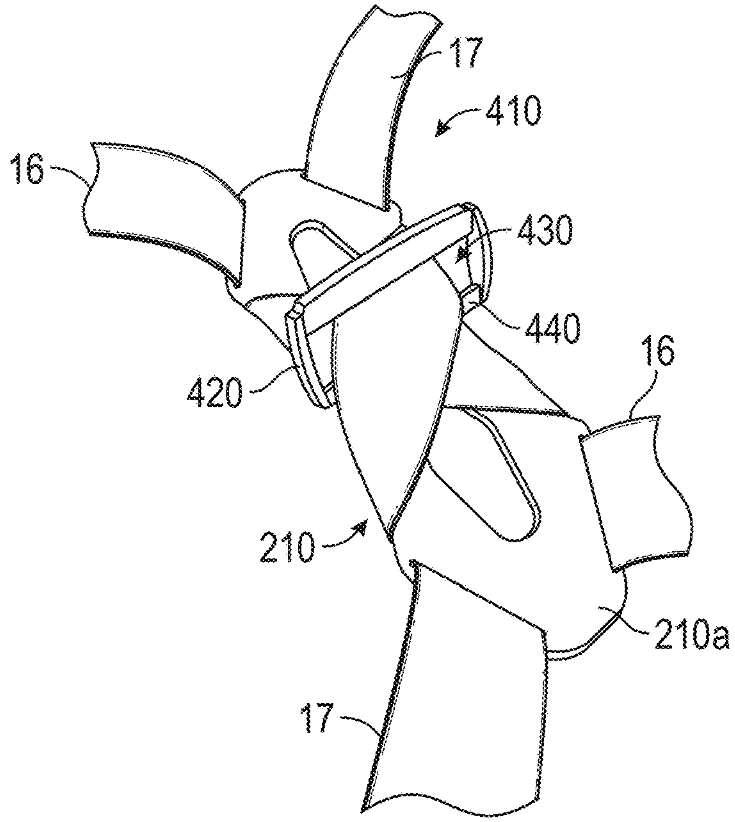
FIG. 14 is a schematic perspective view of the harness shock absorber assembly with its deformable element according to an embodiment of the present disclosure.
Figure 15:
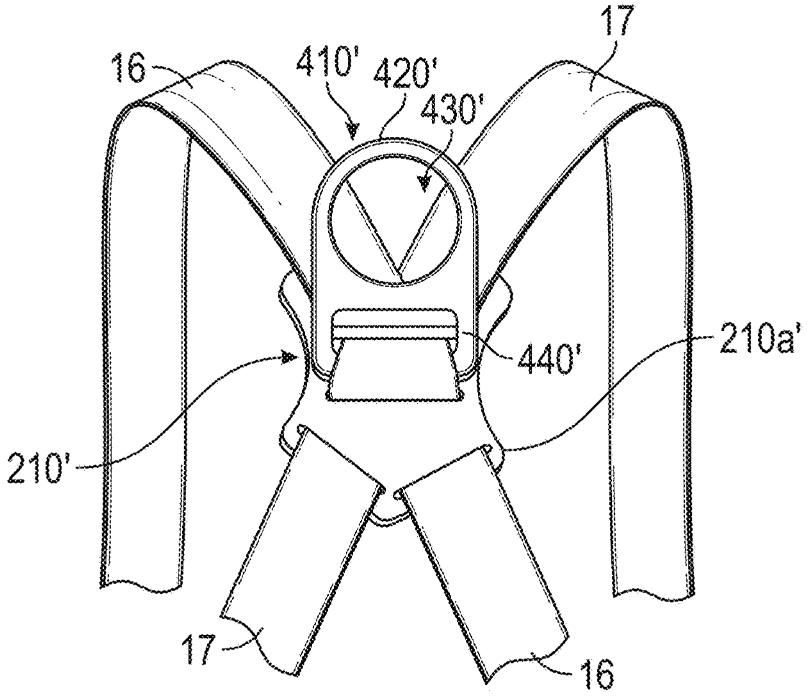
FIG. 15 is a schematic perspective view of the harness shock absorber assembly with its deformable element according to an embodiment of the present disclosure.
Figure 16:
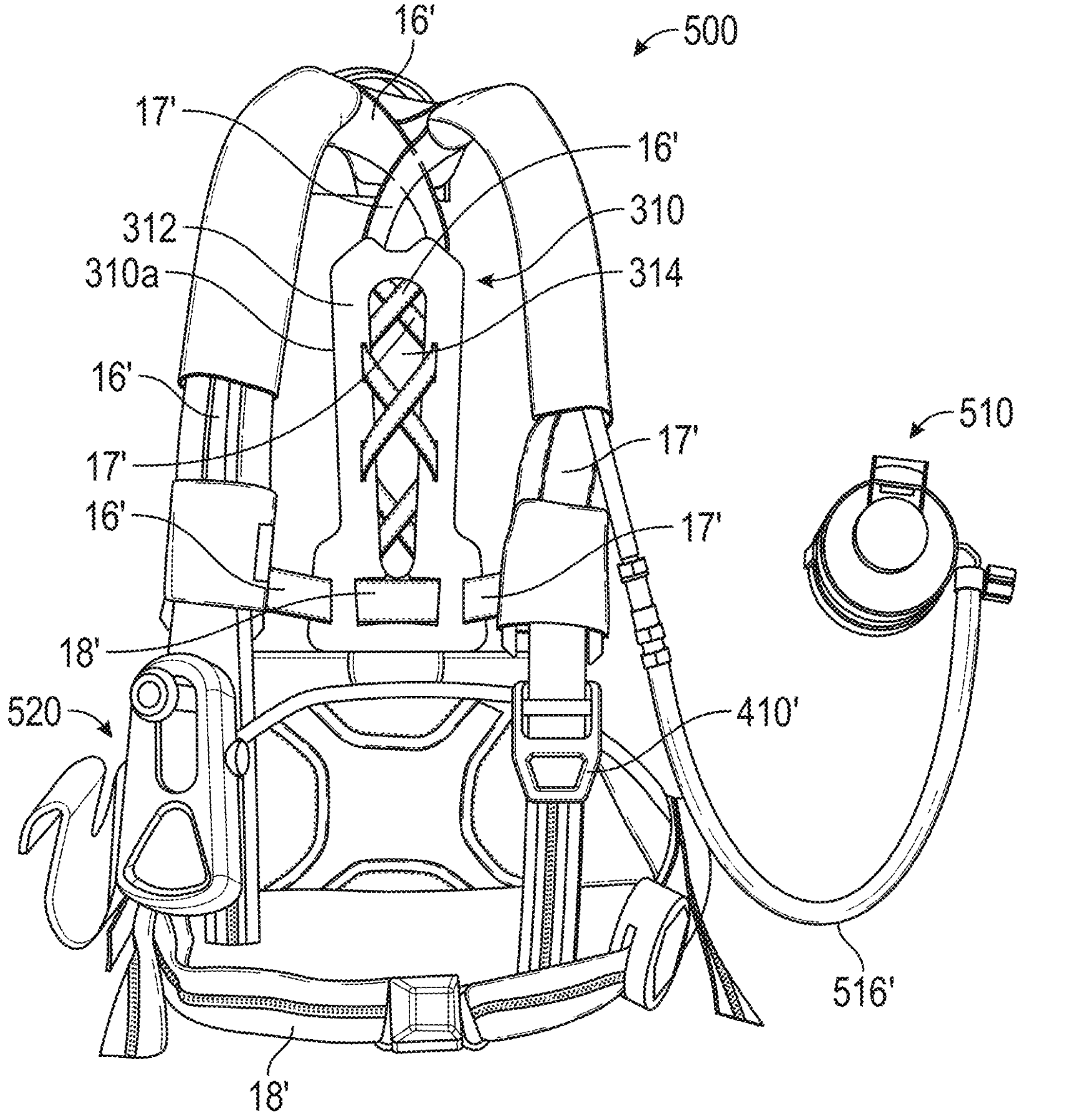
FIG. 16 is a schematic front view of a SCBA harness according to one embodiment of the present disclosure.
Figure 17:
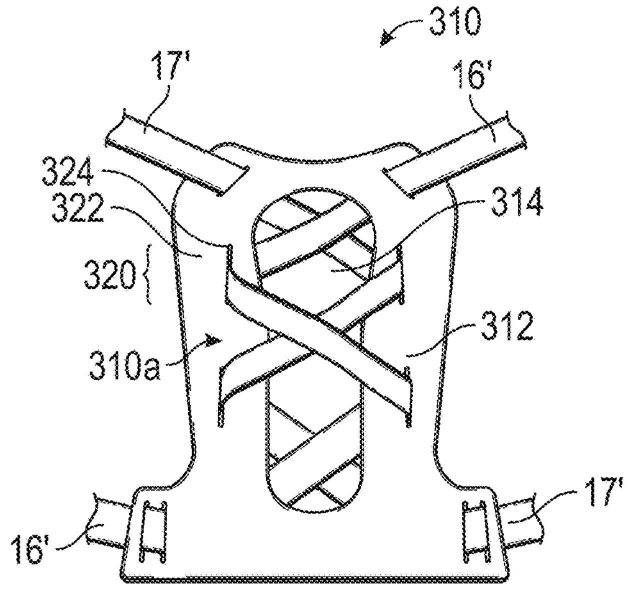
FIG. 17 is a schematic top view of an embodiment of the harness shock absorber assembly of the present disclosure for a SCBA harness with two flexible straps assembled to the deformable element.
Figure 18:
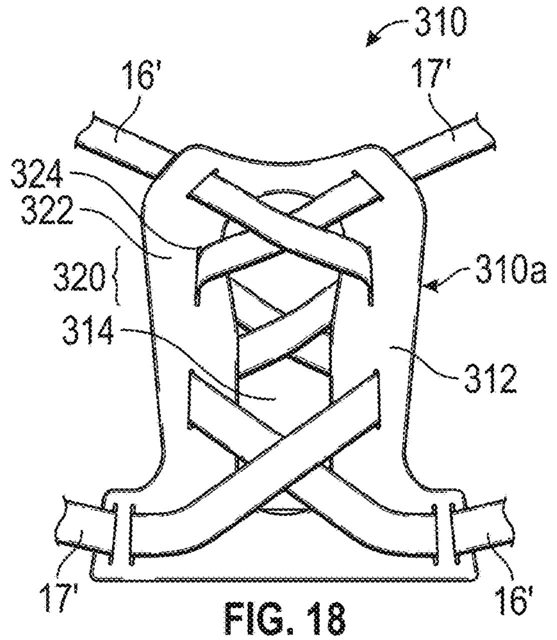
FIG. 18 is a schematic rear view of the harness shock absorber assembly as shown in FIG. 17.
Figure 19:
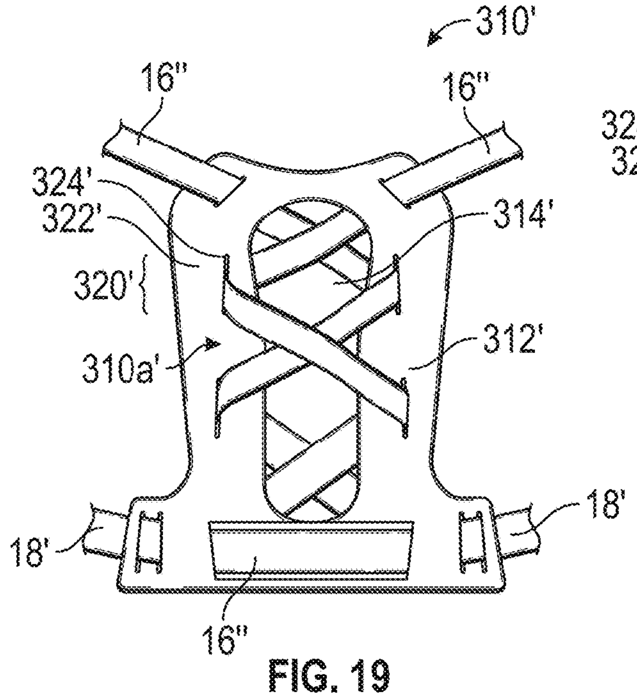
FIG. 19 is a schematic top view of an embodiment of the harness shock absorber assembly according to a different embodiment of the present disclosure for a SCBA harness with two flexible straps assembled to the deformable element and FIG. 20 is a schematic rear view of the harness shock absorber assembly as shown in FIG. 19.
Figure 20:
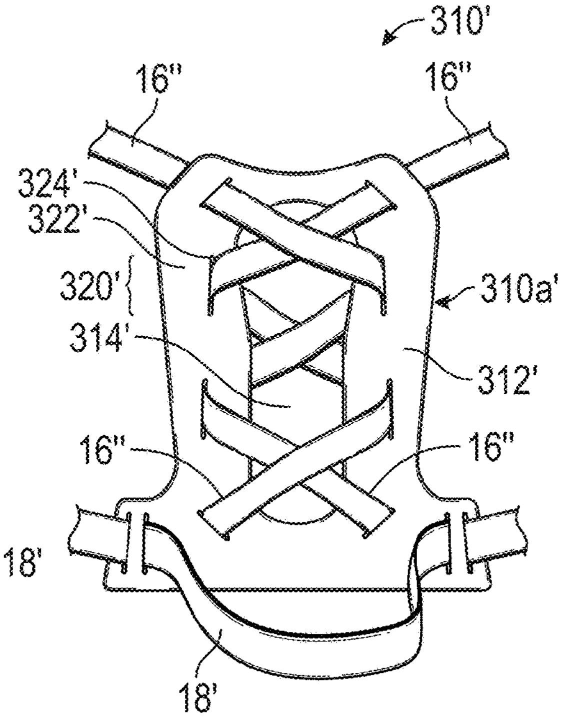

The invention claimed is:

1. A harness shock absorber assembly comprising a deformable element exhibiting a mechanical resistance against deformation; and, a flexible strap comprising a middle portion and two protruding portions facing away from each other, wherein the middle portion is tightly wrapped around the deformable element such that pulling the protruding portions away from each other deforms the deformable element;

wherein the deformable element exhibits an elongated shape having a length (l), a width (w) perpendicular to the length (l), a thickness (t) perpendicular to the length (l) and the width (w) and support distances (d1, d2, d3) arranged on the deformable element for supporting the strap, wherein the deformable element can be brought from a non-deformed condition with the length (l), the thickness (t), the width (w) and the support distances (d1, d2, d3) to a deformed condition with the length (l'), the thickness (t'), the width (w') and the support distances (d1', d2', d3'), such that the length (l') is smaller than length (l), the width (w') is smaller than the width (w), the support distance (d1') is smaller than the support distance (d1), the support distance (d2') is smaller than the support distance (d2) and/or the support distance (d3') is smaller than the support distance (d3).

2. The harness shock absorber assembly according to claim 1, wherein the deformable element comprises a main body and an opening formed therein, wherein the main body and/or the opening are deformed upon deformation of the deformable element.

3. The harness shock absorber assembly according to claim 1, wherein the middle portion is supported by the deformable element.

4. The harness shock absorber assembly according to claim 1, wherein the two protruding portions of the flexible strap each protrude from different sides of the deformable element.

5. The harness shock absorber assembly according to claim 1, wherein the deformable element comprises strap guiding means for guiding the strap at the deformable element, wherein the strap guiding means preferably comprises a guiding arm arranged such that a slot for receiving the strap is formed between the guiding arm and the main body of the deformable element.

6. The harness shock absorber assembly according to claim 5, wherein the strap comprises a twisted portion when wrapped around the deformable element such that the strap exhibits a 180 degrees twist at the deformable element, wherein the strap preferably comprises two twisted portions.

7. The harness shock absorber assembly according to claim 1, comprising a second flexible strap, the flexible strap and the second flexible strap each comprising a middle portion and two protruding portions facing away from each other, wherein the middle portion is tightly wrapped around the deformable element such that pulling the protruding portions away from each other deforms the deformable element, wherein the middle portions of the two straps at least partially overlap with each other.

8. The harness shock absorber assembly according to claim 1, wherein the deformable element comprises a reversibly deformable material.

9. The harness shock absorber assembly according to claim 1, wherein the deformable element comprises a non-reversibly deformable material.

10. The harness shock absorber assembly according to claim 1, comprising an indicator for indicating a deformation of the deformable element.

11. A fall protection safety harness comprising a harness shock absorber assembly according to claim 1, wherein the fall protection safety harness comprises at least one shoulder strap and at least one waist strap, wherein the at least one shoulder strap and/or the at least one waist strap forms the strap of the harness shock absorber assembly.

12. A SCBA harness comprising a harness shock absorber assembly according to claim 1, wherein the SCBA harness comprises at least one shoulder strap and at least one waist strap, wherein the at least one shoulder strap and/or the at least one waist strap forms the strap of the harness shock absorber assembly.

13. A harness shock absorber assembly comprising a deformable element exhibiting a mechanical resistance against deformation; and, a flexible strap comprising a middle portion and two protruding portions facing away from each other, wherein the middle portion is tightly wrapped around the deformable element such that pulling the protruding portions away from each other deforms the deformable element;

wherein the deformable element comprises strap guiding means for guiding the strap at the deformable element, wherein the strap guiding means preferably comprises a guiding arm arranged such that a slot for receiving the strap is formed between the guiding arm and the main body of the deformable element; and wherein the strap comprises a twisted portion when wrapped around the deformable element such that the strap exhibits a 180 degrees twist at the deformable element, wherein the strap preferably comprises two twisted portions.

14. A fall protection safety harness comprising a harness shock absorber assembly according to claim 13, wherein the fall protection safety harness comprises at least one shoulder strap and at least one waist strap, wherein the at least one shoulder strap and/or the at least one waist strap forms the strap of the harness shock absorber assembly.

15. A SCBA harness comprising a harness shock absorber assembly according to claim 13, wherein the SCBA harness comprises at least one shoulder strap and at least one waist strap, wherein the at least one shoulder strap and/or the at least one waist strap forms the strap of the harness shock absorber assembly.

* * * * *